United States Patent
Chang

(10) Patent No.: US 12,365,604 B2
(45) Date of Patent: Jul. 22, 2025

(54) SYNERGISTIC GREEN SORPTION MEDIA FOR CYANOBACTERIAL TOXIN REMEDIATION

(71) Applicant: University of Central Florida Research Foundation, Inc., Orlando, FL (US)

(72) Inventor: Ni-Bin Chang, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/776,678

(22) Filed: Jul. 18, 2024

(65) Prior Publication Data

US 2025/0026666 A1   Jan. 23, 2025

Related U.S. Application Data

(60) Provisional application No. 63/514,436, filed on Jul. 19, 2023.

(51) Int. Cl.
*C02F 1/28* (2023.01)
*B01D 39/20* (2006.01)
(Continued)

(52) U.S. Cl.
CPC .......... *C02F 1/288* (2013.01); *B01D 39/2027* (2013.01); *B01D 39/2055* (2013.01);
(Continued)

(58) Field of Classification Search
None
See application file for complete search history.

(56) References Cited

U.S. PATENT DOCUMENTS 8,563,701 B2    9/2013   Ehmann et al.
11,162,066 B2  11/2021   El-Shehawy et al.
(Continued)

FOREIGN PATENT DOCUMENTS

CN          113072191 A   *   7/2021    ............... C02F 3/32

OTHER PUBLICATIONS

Machine translation of CN-113072191-A, pp. 1-6. (Year: 2021).*
(Continued)

*Primary Examiner* — Clare M Perrin
(74) *Attorney, Agent, or Firm* — Owen G. Behrens; Smith & Hopen, P.A.

(57) ABSTRACT

Described herein relates to a low-cost, synergistic, and/or green sorption media and methods thereof capable of removing MC-LR in-situ over different landscapes. The synergistic composition may include a mixture of a plurality of sand particles, a plurality of biochar particles, a plurality of clay particles, a plurality of zero-valent iron (hereinafter "ZVI") iron molecules, and/or a plurality of perlite particles. In certain embodiments, the plurality of clay particles, plurality of ZVI molecules, and/or plurality of perlite particles may have an approximately equal volume percentage, with the volume percentage being less than or equal to a volume percentage of the plurality of biochar particles. Furthermore, the synergistic composition may be homogenously mixed and/or included in a media chamber of a filtration system.

20 Claims, 11 Drawing Sheets

(51) Int. Cl.
  *B01J 20/20* (2006.01)
  *B01J 20/28* (2006.01)
  *C02F 101/38* (2006.01)

(52) U.S. Cl.
  CPC ......... *B01J 20/20* (2013.01); *B01J 20/28011* (2013.01); *B01J 20/28016* (2013.01); *B01J 20/28059* (2013.01); *B01J 20/28061* (2013.01); *B01D 39/2068* (2013.01); *C02F 1/281* (2013.01); *C02F 1/283* (2013.01); *C02F 2101/38* (2013.01)

(56) References Cited

U.S. PATENT DOCUMENTS

| | | |
|---|---|---|
| 2014/0017276 A1 | 1/2014 | Ehmann et al. |
| 2022/0089463 A1* | 3/2022 | Ervin ............... C02F 1/286 |
| 2023/0159362 A1* | 5/2023 | Zhang ............... C02F 1/006 210/170.05 |

OTHER PUBLICATIONS

Iyad Ahmed Abboud, "Describe and Statistical Evaluation of Hydrochemical Data of Karst Phenomena in Jordan: Al-Dhaher Cave Karst Spring," Journal of Applied Geology and Geophysics. May-Jun. 2014. vol. 2, Issue 3, pp. 23-42.

J. Appel, "Freundlich's Adsorption Isotherm," Surface Science. 1973, 39:237-244.

Elisee Nsimba Bakatula et al. "Determination of point of zero charge of natural organic materials," Environmental Science and Pollution Research (2018) 25:7823-7833.

Madhavi Billam et al. "Seasonal Variations in the Concentration of Microcystin-LR in Two Lakes in Western Texas, USA" Environmental Toxicology and Chemistry, vol. 25, No. 2, pp. 349-355, 2006.

Luděk Bláha et al. "Toxins produced in cyanobacterial water blooms—toxicity and risks" Interdisc Toxicol. 2009; vol. 2(2): 36-41.

P. Gert-Jan De Maagd et al. "pH-Dependent Hydrophobicity of the Cyanobacteria Toxin Microcystin-LR" Wat. Res. Vol. 33, No. 3, pp. 677-680, 1999.

Dariusz Dziga et al. "Microbial Degradation of Microcystins" 2013. Chemical Research in Technology, 26: 841-852.

"Drinking Water Health Advisory for the Cyanobacterial Microcystin Toxins," U.S. Environmental Protection Agency. Jun. 2015.

Daria Filatova, "Origin and release of cyanotoxins in surface water reservoirs" 2021, pp. 1-218. University of Barcelona, CSIC.

Yu-qiong Gao et al. "Adsorption of Microcystin-LR from Water with Iron Oxide Nanoparticles" Water Environment Research. Jul. 2012. vol. 84, No. 7. pp. 562-568.

Yingbo C. Guo et al. "Analysis of Microcystins in Drinking Water" Journal AWWA. Mar. 2017. 109:3, pp. 13-25.

Y.S. Ho et al. "Sorption Studies of Acid Dye by Mixed Sorbents" Adsorption 7: 139-147, 2001.

J. Y. Hu et al. "Disinfection By-Products in Water Produced by Ozonation and Chlorination" Environmental Monitoring and Assessment 59: 81-93, 1999.

Winn-Jung Huang et al. "Adsorption of microcystin-LR by three types of activated carbon" Journal of Hazardous Materials 141 (2007) 115-122.

Shams Kalam et al. "Surfactant Adsorption Isotherms: A Review" ACS Omega 2021, 6, 32342-32348.

Irving Langmuir "Vapor Pressures, Evaporation, Condensation and Adsorption" Jul. 6, 1932. vol. 54, pp. 2798-2812.

Abdiel E. Laureano-Rosario et al. "Dynamics of microcystins and saxitoxin in the Indian River Lagoon, Florida" Harmful Algae 103 (2021) 102012.

Jun Ho Lee et al. "Characterization of Urban Stormwater Runoff" Wat. Res. vol. 34, No. 6, pp. 1773-1780, 2000.

Jungju Lee et al. "Adsorption of microcystin-LR onto iron oxide nanoparticles" Colloids and Surfaces A: Physicochem. Eng. Aspects 373 (2011) 94-100.

Liang Li et al. "Mechanisms and Factors Influencing Adsorption of Microcystin-LR on Biochars" Water Air Soil Pollut (2014) 225:2220.

Yen-Ling Liu et al. "Adsorption of microcystin-LR onto kaolinite, illite and montmorillonite" Chemosphere 220 (2019) 696-705.

Robert J. Morris et al. "The adsorption of microcystin-LR by natural clay particles" Toxicon 38 (2000) 303-308.

Uwe Neumann et al. "Elimination of Microcystin Peptide Toxins from Water by Reverse Osmosis" Microcystin Removal by Reverse Osmosis. Jun. 1997. pp. 143-148.

M. Sathishkumara et al. "Experimental studies on removal of microcystin-LR by peat" Journal of Hazardous Materials 184 (2010) 417-424.

"Climate Change, Health, and Health Care Systems: A Global Perspective" Gastroenterology 2022;162:1549-1555.

Ayman R. Shawwa et al. "Kinetics of Microcystin-LR Oxidation by Ozone" Ozone: Science & Engineering, 23:2, 161-170.

Margarida Ribau Teixeira et al. "Microcystins removal by nanofiltration membranes" Separation and Purification Technology 46 (2005) 192-201.

"Cyanobacterial toxins: Microcystin-LR in Drinking-water" 1 Guidelines for drinking-water quality, 2nd ed. Addendum to vol. 2. Health criteria and other supporting information. World Health Organization, Geneva, 1998.

Bojana Zegura et al. "Microcystin-LR induces oxidative DNA damage in human hepatoma cell line HepG2" Toxicon 41 (2003) 41-48.

Ming-ming Zhan et al. "Recent Advances in Technologies for Removal of Microcystins in Water: a Review" Current Pollution Reports (2022) 8:113-127.

S. Abadian et al. "Cu(II) adsorption onto Platanus orientalis leaf powder: kinetic, isotherm, and thermodynamic studies" Res Chem Intermed (2015) 41:7669-7681.

Husein Almuhtaram et al. The Importance of Measuring Ultraviolet Fluence Accurately: A Review of Microcystin-LR Removal by Direct Photolysis. Environ. Sci. Technol. Lett. 2021, 8, 199-205.

Susana F Baldia et al. "Microcystin production during algal bloom occurrence in Laguna de Bay, the Philippines" Fisheries Science 2003; 69: 110-116.

Amit Bhatnagar et al. "A comparative adsorption study with different industrial wastes as adsorbents for the removal of cationic dyes from water" Journal of Colloid and Interface Science 281 (2005) 49-55.

Margarida Campinas et al. "The ionic strength effect on microcystin and natural organic matter surrogate adsorption onto PAC" Journal of Colloid and Interface Science 299 (2006) 520-529.

Fuhar Dixit et al "Microcystin-LR removal by ion exchange: Investigating multicomponent interactions in natural waters" Environmental Pollution 253 (2019) 790-799.

Amanda J. Foss et al. "Analysis of total microcystins and nodularins by oxidative cleavage of their ADMAdda, DMAdda, and Adda moieties" Analytica Chimica Acta: X 6 (2020) 100060.

M.E. González-López et al. "A discussion on linear and non-linear forms of Thomas equation for fixed-bed adsorption column modeling" Revista Mexicana de Ingeniería Química. 2021. pp. 875-884. vol. 20, No. 2.

Xuan Guo et al. "Comparison of linearization methods for modeling the Langmuir adsorption isotherm" Journal of Molecular Liquids 296 (2019) 111850.

Pratik Kumar et al. "Removal of microcystin-LR and other water pollutants using sand coated with bio-optimized carbon submicron particles: Graphene oxide and reduced graphene oxide" Chemical Engineering Journal 397 (2020) 125398.

Timothy W. Lambert et al., "Adsorption of Microcystin-LR by Activated Carbon and Removal in Full Scale Water Treatment." Wat. Res. vol. 30, No. 6, pp. 1411-1422. 1996.

Brian E. Lapointe et al. "Evidence of sewage-driven eutrophication and harmful algal blooms in Florida's Indian River Lagoon" Harmful Algae 43 (2015) 82-102.

(56) References Cited

OTHER PUBLICATIONS

Linda A. Lawton et al. "Processes influencing surface interaction and photocatalytic destructionof microcystins on titanium dioxide photocatalysts" Journal of Catalysis 213 (2003) 109-113.

Jungji Lee et al. "Effect of Process Variables and Natural Organic Matter on Removal of Microdystin-LR by PAC-UF" Environ. Sci. Technol. 2006, 40, 7336-7342.

Jungju Lee et al. "Mechanisms and factors influencing the removal of microcystin-LR by ultrafiltration membranes" Journal of Membrane Science 320 (2008) 240-247.

Jieming Li et al. "Investigations into the biodegradation of microcystin-LR mediated by the biofilm in wintertime from a biological treatment facility in a drinking-water treatment plant" Bioresource Technology 106 (2012) 27-35.

Guocheng Liu et al. "Characteristics and mechanisms of microcystin-LR adsorption by giant reed-derived biochars: Role of minerals, pores, and functional groups" Journal of Cleaner Production 176 (2018) 463-473.

Yen-Ling Liu et al. "The effect of natural organic matter on the adsorption of microcystin-LR onto clay minerals" Colloids and Surfaces A 583 (2019) 123964.

Yaqoob Lone et al. "An overview of the toxic effect of potential human carcinogen Microcystin-LR on testis" Toxicology Reports 2 (2015) 289-296.

Wilton S. Lopes et al. "Removal of Microcystin-LR from Drinking Water Using a System Involving Oxidation and Adsorption" Water Air Soil Pollut (2017) 228: 337.

Phodiso P. Mashile et al. "Adsorptive removal of microcystin-LR from surface and wastewater using tyre-based powdered activated carbon: Kinetics and isotherms" Toxicon 145 (2018) 25-31.

Sergio Marcos Sanches2 et al. "Presença da toxina microcistina em água, impactos na saúde pública e medidas de controle" Rev Ciêncarm Básica Apl., 2012;33(2):181-187, Abstract only Dec. 23, 2024.

Diana Ordonez et al. "Continuous fixed-bed column adsorption of perfluorooctane sulfonic aci PFOS) and perfluorooctanoic acid (PFOA) from canal water using zero-valent Iron-based filtration media" Separation and Purification Technology 299 (2022) 121800.

Shruti Pavagadhi et al. "Removal of microcystin-LR and microcystin-RR by graphene oxide: Adsorption and kinetic experiments" Water Research 47 (2013) 4621-4629.

Edward J. Phlips "Scales of temporal and spatial variability in the distribution of harmful algae species in the Indian River Lagoon, Florida, USA" Harmful Algae 10 (2011) 277-290.

P.C. Piyathilaka et al. "Microcystin-LR Contamination Status and Physico-Chemical Water Quality Parameters of Five Selected Recreational Water Bodies in Sri Lanka" Journal of Food and Agriculture 2017, 10 (1&2): 35-42.

P.V. Lakshmana Rae et al. "The cyanobacterial toxin microcystin-LR induced DNA damage in mouse liver in vivo" Toxicology 114 (1996) 29-36.

Jian Rong et al. "High-Specific Surface Area Hierarchical Al2O3 Carbon Fiber Based on A Waste Paper Fiber Template: Preparation and Adsorption for Iodide Ions" Journal of Wood Chemistry and Technology, 37:6, 485-492.

Balachandran Sadaiyan et al. "Adsorptive removal of orange G dye from aqueous solution by ultrasonic-activated peanut shell powder: isotherm, kinetic and thermodynamic studies" Environmental Technology, 45:20, 4131-4145.

Matthew A. Saxon et el. "Plasticity of total and nitracellular phosphorus quotas in Microcytis aeruginosa cultures and Lake Erie algal assemblages" Frontiers in Microbiology. Jan. 2012, vol. 3, Art. 3.

A V Selezneva et al. "Nanofiltration to Purify Drinking Water from Cyanobacteria and Microcystins in Water Supply Systems" International Science and Technology Conference (FarEastCon 2020) IOP Conf. Series: Materials Science and Engineering, 1079 (2021) 022043.

Jiyun Song et al. "Adsorption characteristics of methylene blue by peanut husk in batch and column modes" Desalination 265 (2011) 119-125.

M. N. Subramaniam et al. "Adsorption and photocatalytic degradation of methylene blue using high surface area titanate nanotubes (TNT) synthesized via hydrothermal method" J Nanopart Res (2017) 19: 220.

Sunzida Sultana et al. "Cyanobacterial blooms in earthen aquaculture ponds and their impact on fisheries and human health in Bangladesh" Aquaculture Research. 2022;53:5129-5141.

Jose Maria et al. "Toxic cyanobacteria and microcystin concentrations in a public water supply reservoir in the Brazilian Amazonia region" Toxicon 45 (2005) 901-909.

Kathryn Villars et al. "Removal of the Cyanotoxin Microcystin-LR from Drinking Water Using Granular Activated Carbon" Environmental Engineering Science. Volume 37, No. 9, pp. 585-595, 2020.

Qi Wang et al. "Changes of Extracellular Polymeric Substance (EPS) during Microcystis Aeruginosa Blooms at Different Levels of Nutrients in a Eutrophic Microcosmic Simulation Device" Pol. J. Environ. Stud. vol. 29, No. 1 (2020), 349-360.

Can Wu et al. "The double influence mechanism of pH on arsenic removal by nano zero valent iron: electrostatic interactions and the corrosion of Fe" Environ. Sci.: Nano, 2017, 4, 1544.

Xiaoyu Xiao et al. "Reduced Adsorption of Propanil to Black Carbon: Effect of Dissolved Organic Matter Loading Mode and Molecule Size" Environmental Toxicology and Chemistry, vol. 31, No. 6, pp. 1187-1193, 2012.

Ni Zhang et al. "Effect of Phosphate Loading on the Generation of Extracellular Organic Matters of Microcystis Aeruginosa and Its Derived Disinfection By-Products" Water Air Soil Pollut (2016) 227: 264.

Xinran Zhang et al. "Elimination kinetics and detoxification mechanisms of microcystin-LR during UV/Chlorine process" Chemosphere 214 (2019) 702-709.

\* cited by examiner

SYNERGISTIC GREEN SORPTION MEDIA FOR CYANOBACTERIAL TOXIN REMEDIATION

CROSS-REFERENCE TO RELATED APPLICATIONS

This Nonprovisional patent application claims the benefit of and priority to U.S. Provisional Application No. 63/514,436 entitled "SYNERGISTIC GREEN SORPTION MEDIA FOR CYANOBACTERIAL TOXIN REMEDIATION" filed Jul. 19, 2023 by the same inventor, all of which is incorporated herein by reference, in its entirety, for all purposes.

BACKGROUND OF THE INVENTION

1. Field of the Invention

This invention relates, generally, to media used to remediate the impact of cyanobacterial toxins (such as microcystin) on bodies of water due to the presence of harmful algal blooms (HABs) driven by eutrophication. More specifically, it relates to synergistic functionalities between biochar, iron, and perlite that improve cyanobacterial toxin remediation from a water source.

2. Brief Description of the Prior Art

Global overproduction of goods, overpopulation, and deforestation have impacted different natural environments, triggering climate change, soil erosion, air pollution, reduction of drinking water sources, and rising pollution of water systems (Setoguchi et al., 2022). The increase in contamination of surface water systems with nutrients causes eutrophication, which induces the occurrence of HABs. The presence of HABs not only has detrimental effects on aquatic ecosystems, but also exhibits an impact on human health. HABs contain cyanobacteria, which in high quantities can uptake the oxygen and nutrients in an ecosystem, depriving it from other organisms. Moreover, cyanobacteria produce cyanotoxins, which greatly affect the ecosystem's health in an aquatic environment (Sultana et al., 2022). The cyanotoxins include microcystins (MCs), cylindrospermopsin, and anatoxin-a group, where MCs' toxins are often dominant (Filatova, 2021; Su et al., 2017). MCs are cyclic heptapeptide toxics and are categorized as the most toxic cyanotoxin species.

Microcystin-LR (MC-LR), a type of MC, is the most common and toxic algae toxin with a median lethal dose (LD50) of 50 $\mu g \cdot kg^{-1}$ of body weight (Bláha et al., 2009). According to the United States Environmental Protection Agency (US EPA), MC-LR has acute human health effects including abdominal pain, headache, sore throat, vomiting and nausea, diarrhea, blistering, and pneumonia (EPA, 2021). Moreover, the International Agency for Research on Cancer has associated MC-LR with a possible human carcinogen (Lone et al., 2015), and different epidemiological researchers have proposed a correlation between liver cancer and MCs (Rao and Bhattacharya, 1996; egura et al., 2003). To mitigate the effects of MCs on human health, both the World Health Organization (WHO) and the US EPA have passed regulations to control the concentration of MCs in drinking and recreational waters. For instance, the WHO has set provisional guidelines for drinking water and recreational water concentrations not to exceed 1 $\mu g \cdot L^{-1}$ and 24 $\mu g \cdot L^{-1}$, respectively (WHO 2020). Moreover, the US EPA has set the drinking water health advisory (average of 10th days) to 1.6 $\mu g \cdot L^{-1}$ and a criterion of 8 $\mu g \cdot L^{-1}$ of MCs for recreational water (US EPA 2015).

Considering the drinking water guidelines and health advisory concentrations, efforts to treat MC in drinking water have intensified. Different technologies have proven to be effective in removing MCs from water, including nanofiltration (Selezneva et al., 2021; Teixeira and Rosa, 2005), ultrafiltration (Lee and Walker, 2008; Zhan and Hong, 2022), and reverse osmosis (Neumann and Weckesser, 1998; Zhan and Hong, 2022), yet these technologies are applicable mostly to drinking water treatment. Other technologies such as chlorination (Zhang et al., 2019) and ozonation (Shawwa and Smith, 2001) have also been shown to achieve efficient removals of MCs; however, chlorination can result in disinfectant by-products if not properly dosed when the high concentration of natural organic matter is present in source water (Hu et al., 1999). Other separation and purification techniques such as photolysis (Almuhtaram et al., 2021), microbial degradation (Dziga et al., 2013), and Fenton reaction (Lopes et al., 2017) have been employed; nevertheless, these current technologies described in above can be costly.

Because MCs tend to be removed using organic substances, granulated activated carbon (GAC), and powdered activated carbon (PAC) have been widely employed for adsorption of MCs (Lopes et al., 2017). Lambert et al. (1996) studied the performance of GAC and PAC in a drinking water treatment system and concluded that 80% of MCs was removed from raw water, meeting the guidance level for drinking water set by Health Canada. Meanwhile, the removal of 4 MCs (MC-LR, MC-LY, MC-LW, MC-LF) onto PAC under the presence of natural organic matter (NOM) was explored along with the effect of ionic strength. It was concluded that the presence of $Ca^{2+}$ improved adsorption in particular (Campinas and Rosa, 2006). Pavagadhi et al. (2013) indicated that high adsorption capacity was observed by graphene oxide for MC-LR (1,699.7 $\mu g \cdot g^{-1}$) and Microcystin-RR (MC-RR) (1,877.8 $\mu g \cdot g^{-1}$). Furthermore, Pavagadhi et al. (2013) explored the effect that different anions and cations (normal environmental pollutants) have on the MC-LR and MC-RR adsorption capacity of graphene oxide and concluded that some environmental pollutants might reduce the adsorption capacity of graphene oxide for MC-LR but not for MC-RR.

Other researchers have found that kaolinite, illite, and montmorillonite can also affect adsorption of MC-LR (Liu et al., 2019b). For example, Morris et al. (2000) found that kaolinitic and montmorillonitic clay materials can remove MC-LR from water, achieving removals of up to 81%. The displayed high adsorption capacity of sediments is suggested from the interaction between surface-bound NOM in the material that binds to the hydrophobic β-(2S, 3S, 8S, 9S)-3-amino-9-methoxy-2, 6, 8-trimethyl-10-phenyldeca-4,6-dienoic acid (Adda) group of MC-LR via hydrophobic bonding (Liu et al., 2019b). Moreover, researchers have found better MC-LR adsorption to iron oxide nanoparticles at lower fulvic acid concentrations by enhancing the hydrophobic attraction of the MC-LR (Lee and Walker, 2011). Another contributor to the effect of adsorption on kaolinite is the negative net charge of MC-LR molecules with pH of 2.19-12.48 that can be attracted or repelled by the adsorbate surface (de Maagd et al., 1999).

The physical and chemical characteristics of the water can affect MC production. For instance, Baldia et al. (2003) indicated that the production of MCs was higher when the transparency and the conductivity of water was high, with a production rate of 88.6 μg per 100 mg of dried cell, while $PO_4^{3-}$ acted as a limiting constraint. Conversely, higher concentration of phosphorus can be targeted at zones where algal blooms occur (Zhang et al., 2016; Wang et al., 2019; Saxton et al., 2012). Li et al. (2012) suggested that MC-LR biodegradation by winter biofilm was inhibited in the presence of phosphate because its complete degradation was extended from 7 days to 10 days. Moreover, Yuan et al. (2014) presented a threshold below 570 $\mu g \cdot L^{-1}$ of TN and 37 $\mu g \cdot L^{-1}$ of chlorophyll-a or 1,100 $\mu g \cdot L^{-1}$ of TN and 3 $\mu g \cdot L^{-1}$ of chlorophyll-a to maintain the concentration of MC below 1 $\mu g \cdot L^{-1}$.

As an example, much of Florida's landscape consists of a karst limestone environment, and thus Florida's aquifer supplies more than 8 billion gallons of water each day, providing 90% of the state's drinking water. Therefore, the understanding of the biogeochemical processes in these environments is imperative because these environments are prone to contamination given their morphology (i.e., cracks and crevasses). Karst environments are rich in $Ca^{2+}$; however, they are low on metals availability and biodegradation efficiency. Karst environments are usually high on permeability and have short hydraulic residence time; for this reason, denitrification potential is very low, while nitrification is high. The presence of cyanotoxins in the cave passages at Mammoth National Park was investigated by Byl et al. (2021), and the concentration of MCs ranged from 0.154-2.59 $\mu g \cdot L^{-1}$ in 10 caves. Florida's ecosystems have been highly affected by HABs, partially owing to the presence of abundant phosphate; for instance, Phlips et al. (2011) reported the presence of 24 HAB species, of which 16 were toxin producers, in the Indian River Lagoon. HABs also cause economic impacts, for instance, the Indian River Lagoon, located in Florida, reported an economic impact of ~$197M loss/year between 2011 and 2013 (Lapointe et al., 2015).

Existing methods of removing MCs from water, as described above, include various implementations of activated carbon, ion exchange, membranes, wood-based biochar, iron oxide nanoparticles, bituminous coal, coconut shell, and peat. However, each method suffers from one or more deficiencies resulting in an inability to remove MCs at scale. For example, the use of activated carbon, ion exchanges, membranes, and wood-based biochar are relatively expensive and require sophisticated control schemes; iron oxide nanoparticles are difficult to handle on a larger scale implementation; bituminous coal is in short supply due to preexisting requirements for fuel used in power generation; and coconut shells and peat are exhaustible resources that are currently rare in supply.

Accordingly, what is needed is a low-cost and effective synergistic alternative sorption media, particularly utilizing biochar, used for cyanobacterial toxin remediation over different landscapes while maintaining environmental sustainability. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a synergistic composition for treating water having at least one cyanobacterial toxin. In an embodiment, the synergistic composition may comprise the following: (a) a plurality of sand particles comprising about 80 vol %; (b) a plurality of biochar particles comprising about 5 vol %; and (c) a plurality of perlite particles and/or a plurality of zero-valent iron (hereinafter "ZVI") molecules. In this embodiment, the volume percentage of the plurality of perlite particles and/or the plurality of ZVI molecules may be less than or equal to a volume percentage of the biochar particles.

In some embodiments, the synergistic composition may further comprise a plurality of clay particles comprising about 5 vol %. In these other embodiments, the volume percentage of the plurality of perlite particles and/or the plurality of ZVI molecules may also be about 5 vol %. In this manner, the plurality of biochar particles may be at most about 25 vol %.

In some embodiments, the at least one of the plurality of ZVI molecules may be chemically bonded to at least one of the plurality of biochar particles, forming at least one ZVI-biochar structure. As such, the at least one ZVI-biochar structure of the synergistic composition may comprise a point of zero charge (hereinafter "PZC") of about 9.6 to about 10.6. In this manner, the at least one ZVI-biochar structure of the synergistic composition may also comprise a low saturated hydraulic conductivity. Additionally, in these other embodiments, the at least one ZVI-biochar structure of the synergistic composition may be porous. Furthermore, the at least one ZVI-biochar structure of the synergistic composition may be homogeneous.

In addition, in some embodiments, the synergistic composition may further comprise a Brunauer-Emmett-Teller (hereinafter "BET") surface area of about 1.35 $m^2/g$ to about 3.08 $m^2/g$, encompassing every value in between. In these other embodiments, the synergistic composition may also comprise a density of a density of about 2.59 $g*cm^3$ to about 2.67 $g*cm^3$, encompassing every value in between. In this manner, the synergistic composition may additionally comprise an adsorption capacity of about 1.19 $\mu g/g$.

Moreover, another aspect of the present disclosure pertains to a filtration system for treating water containing cyanobacterial toxins. In an embodiment, the filtration system may comprise the following: (a) a media chamber including a homogeneously mixed synergistic composition, the homogenously mixed synergistic composition comprising: (i) a plurality of sand particles comprising about 80 vol %; (ii) a plurality of biochar particles comprising about 5 vol %; and (iii) a plurality of perlite particles and/or a plurality of zero-valent iron (hereinafter "ZVI") molecules. In this embodiment, the volume percentage of the plurality of perlite particles and/or the plurality of ZVI molecules may be less than or equal to a volume percentage of the biochar particles.

In some embodiments, the filtration system may further comprise a plurality of clay particles comprising about 5 vol %. As such, in these other embodiments, the volume percentage of the plurality of perlite particles and/or the plurality of ZVI molecules may be about 5 vol %. Additionally, the plurality of biochar particles may also be at most about 25 vol %.

Furthermore, an additional aspect of the present disclosure pertains to a method of optimizing cyanobacterial toxin removal from a water supply. In an embodiment, the method may comprise the following steps: (a) incorporating a homogenously mixed synergistic composition into the water supply, the homogenously mixed synergistic composition comprising: (i) a plurality of sand particles comprising about 80 vol %; (ii) a plurality of biochar particles comprising about 5 vol %; and (iii) a plurality of perlite particles, a plurality of zero-valent iron (hereinafter "ZVI") molecules, or both, such that the volume percentage of the plurality of perlite particles and/or the plurality of ZVI molecules may be less than or equal to a volume percentage of the biochar particles. In this embodiment, the incorporation of the homogenously mixed synergistic composition into the water supply thereof may optimize the cyanobacterial toxin removal within the water supply.

In some embodiments, the homogenously mixed synergistic composition further comprises a plurality of clay particles comprising about 5 vol %. As such, in these other embodiments, the volume percentage of the plurality of perlite particles and/or the plurality of ZVI molecules may be about 5 vol %. Moreover, the plurality of biochar particles may also be at most about 25 vol %.

An object of the invention is to improve cyanobacterial toxin remediation from fluids by utilizing a synergistic and environmentally friendly mixture of sand, ZVI, clay particles, perlite, and biochar, thereby improving on the filtration media already known within the art.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1A:
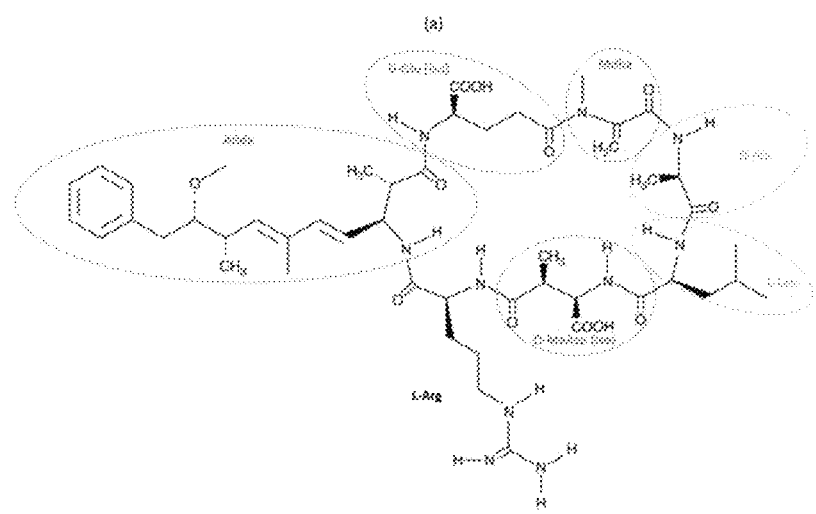
FIG. 1A depicts a chemical structure of microcystin-LR (MC-LR) (cyclo [2,3-didehydro-N-methylalanyl-D-alanyl-L-leucyl-(3S)-3-methyl-D-β-aspartyl-L-arginyl-(2S,3S,4E, 6E,8S,9S)-3-amino-9-methoxy-2,6,8-trimethyl-10-phenyl-4,6-decadienoyl-D-γ-glutamyl]) (molecular formula of $C_{49}H_{74}N_{10}O_{12}$)

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

As such, elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Therefore, a reference to first and/or second elements does not mean that only two elements may be employed there or that the first element must precede the second element in some manner. Also, unless stated otherwise a set of elements may comprise one or more elements Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Figure 1B:
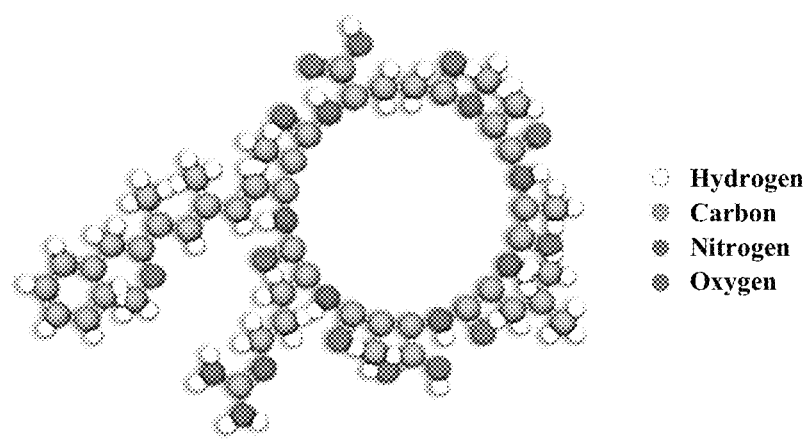
FIG. 1B depicts a three-dimensional structure of MC-LR.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

DEFINITIONS

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

As used herein, the terms "about," "approximately," or "roughly" refer to being within an acceptable error range (i.e., tolerance) for the particular value as determined by one of ordinary skill in the art, which will depend in part on how the value is measured or determined (e.g., the limitations of a measurement system), (e.g., the degree of precision required for a particular purpose, such as remediating the impact of cyanobacterial toxins (such as microcystin) on bodies of water due to the presence of harmful algal blooms (HABs) driven by eutrophication). As used herein, "about," "approximately," or "roughly" refer to within +25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Low-Cost, Synergistic, Green Sorption Media

The present invention pertains to a low-cost, synergistic, green sorption media (hereinafter "synergistic composition") capable of removing MC-LR in-situ over different landscapes (e.g., a karst environment). In an embodiment, the synergistic composition may comprise a mixture of a plurality of sand particles of at most about 80 vol %, a plurality of biochar particles of at least about 5 vol %, a plurality of clay particles, a plurality of zero-valent iron (hereinafter "ZVI) molecules (e.g., iron filing particles), and/or a plurality of perlite particles. In this embodiment, the plurality of clay particles, the plurality of ZVI molecules, and/or a plurality of perlite particles may have an approximately equal volume percentage, with the volume percentage being less than or equal to a volume percentage of the biochar particles. For example, in some embodiments, the volume percentage of each of the plurality of clay particles, the plurality of ZVI molecules (e.g., iron filing particles), and/or the plurality of perlite particles may be at least about 5 vol %.

In an embodiment, the plurality of biochar particles of the synergistic composition may be at most about 25 vol %. In this manner, the synergistic composition may also be homogenously mixed and/or may be included in a media chamber of a filtration system. As such, the synergistic composition may comprise a unit cost per percent removal that may be about 10 times to about 50 times lower than that of existing removal methods (e.g., including activated carbon, ion exchange, and/or membrane methods), and/or about 10 times smaller than pure wood-based biochar, while maintaining large surface area adsorption sites. In this embodiment, the synergistic composition may be usable to remove MCs from a plurality of water matrices (e.g., a karst environment), including ex situ facilities, in situ facilities, springs protection facilities, stormwater utilities, water treatment plants, integrated water resource management facilities (e.g., natural wetlands, constructed wetlands, floating treatment wetlands, low impact developments, green drainage infrastructures, and/or filtration units in watersheds (e.g., groundwater remediation and surface water treatment for lake and/or river restorations)), coastal lagoon and/or estuary remediation sites, agricultural discharge treatment sites, forests, landfills, and/or similar sites known in the art. Embodiments of the synergistic composition are described herein below.

In an embodiment, the synergistic composition may comprise a MC-LR removal efficiency comprising a range of about 44.6% to about 100%, encompassing every value in between. In addition, the synergistic composition may be configured to simultaneously remove MC-LR and/or at least one phosphorus molecule from at least one portion of at least one of a plurality of water matrices. In this manner, the synergistic composition may comprise a phosphate removal efficiency comprising a range of about 33.7% to about 60.6%, encompassing every value in between.

Moreover, to further characterize the MC-LR adsorption capacity of the synergistic composition, isotherm results may be imputed into the Langmuir and Freundlich isotherm models, as shown in TABLE 5 and TABLE 6, provided below. As such, in an embodiment, high correlation efficiencies ($R^2$) may be obtained for the synergistic composition from the linear regression following the Freundlich isotherm. In this manner, in this embodiment, the synergistic composition may comprise an adsorption that is monolayer on at least one of a plurality of homogeneous sites when MC-LR is alone in the influent, whereas, when MC-LR coexists with other contaminants (i.e., $PO_4^{3-}$ and $Ca^{2+}$), the adsorption may be multilayer on at least one of a plurality of heterogeneous sites.

In an embodiment, the adsorption capacities of the synergistic composition may comprise a range from about 1 $\mu g \cdot g^{-1}$ to about 29.49 $\mu g \cdot g^{-1}$, encompassing every value in between. Additionally, as known in the art, the n value derived from the Freundlich isotherm model indicates whether the adsorption is favorable or unfavorable. As such, in this embodiment, for the synergistic composition, the adsorption may be favorable for MC-LR, as shown in TABLE 7, provided below.

In addition, in an embodiment, based on the fitting of the Langmuir isotherm model, the adsorption of MC-LR by the synergistic composition may be both monolayer, when MC-LR is alone, and/or when MC-LR is present with other compositions, the adsorption by the synergistic composition may be multilayer. Moreover, the larger PZC and/or better physical and/or chemical characteristics of the synergistic composition allow, in accordance with the Freundlich model, the adsorption to be maintained as favorable in the presence of $PO_4^{3-}$.

Furthermore, in an embodiment, the presence of cations in the water matrix may be configured to enhance the removal of MC-LR by the synergistic composition. In this embodiment, the $Ca^{2+}$ removal by the synergistic composition may be null, and/or the concentration may remain and/or may be maintained constant throughout the isotherm studies, regardless of the influent condition.

On the other hand, in an embodiment, a decrease in the MC-LR removal efficiency of the synergistic composition may be seen in the presence of $PO_4^{3-}$ and/or an increase in the MC-LR removal efficiency by the synergistic composition may be seen when $Ca^{2+}$ is present in at least one water matrix in a plurality of landscapes (e.g., a karst environment). However, in this embodiment, the removal efficiency of the synergistic composition may not be statistically significant within 95% critical interval in accordance with a 2-way ANOVA.

Figure 5A:
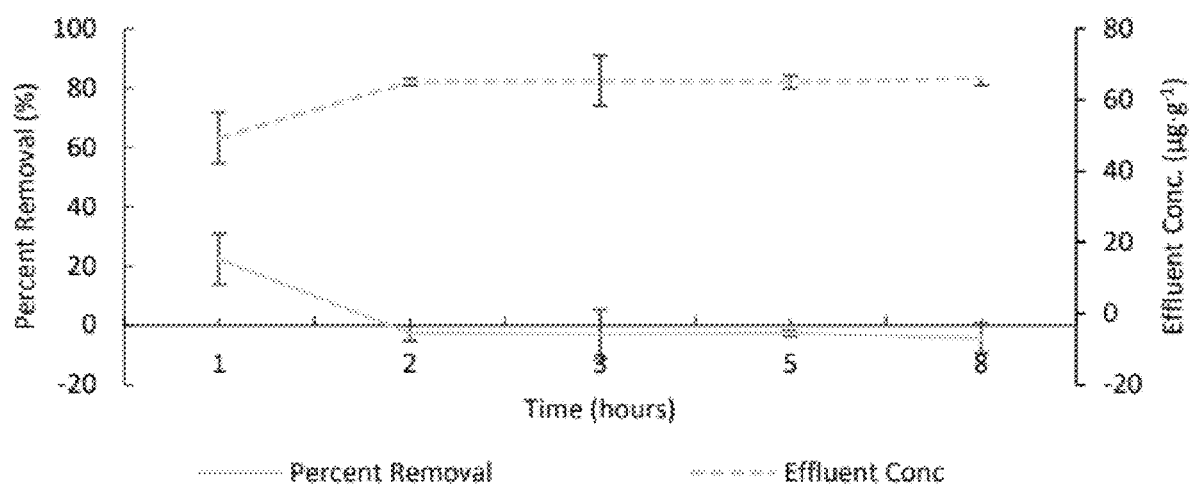
FIG. 5A is a graphical depiction of MC-LR removal curves for a clay, perlite, and sand (CPS) filtration medium from a fixed bed column study with real canal water spiked to 70 $\mu g \cdot L^{-1}$ MC-LR as influent conditions, according to an embodiment of the present disclosure.
Figure 5B:
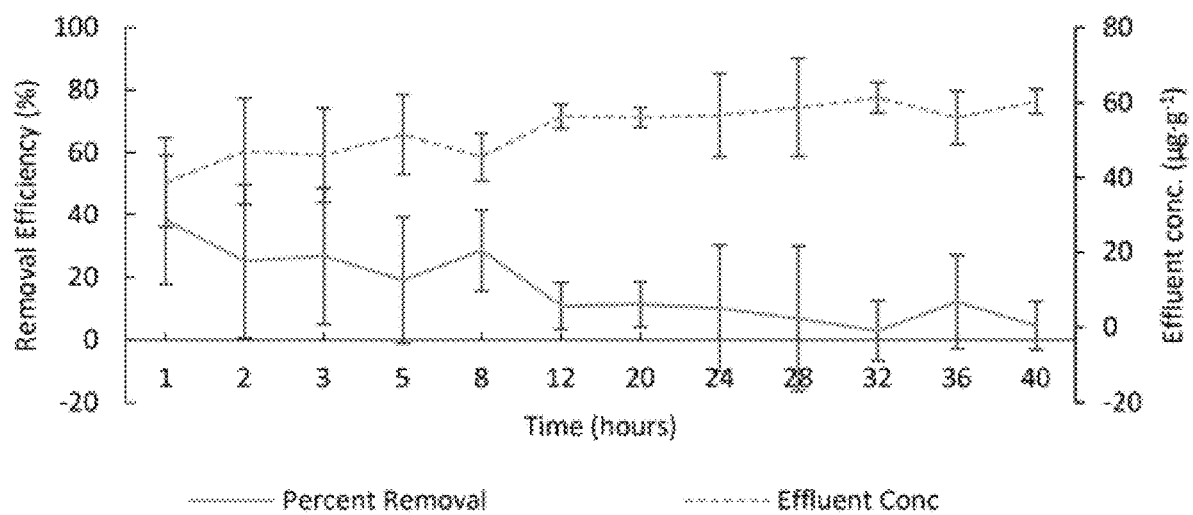
FIG. 5B is a graphical depiction of MC-LR removal curves for a zero-valent-iron- and perlite-based green environmental medium (ZIPGEM) from a fixed bed column study with real canal water spiked to 70 $\mu g \cdot L^{-1}$ MC-LR as influent conditions, according to an embodiment of the present disclosure.
Figure 5C:
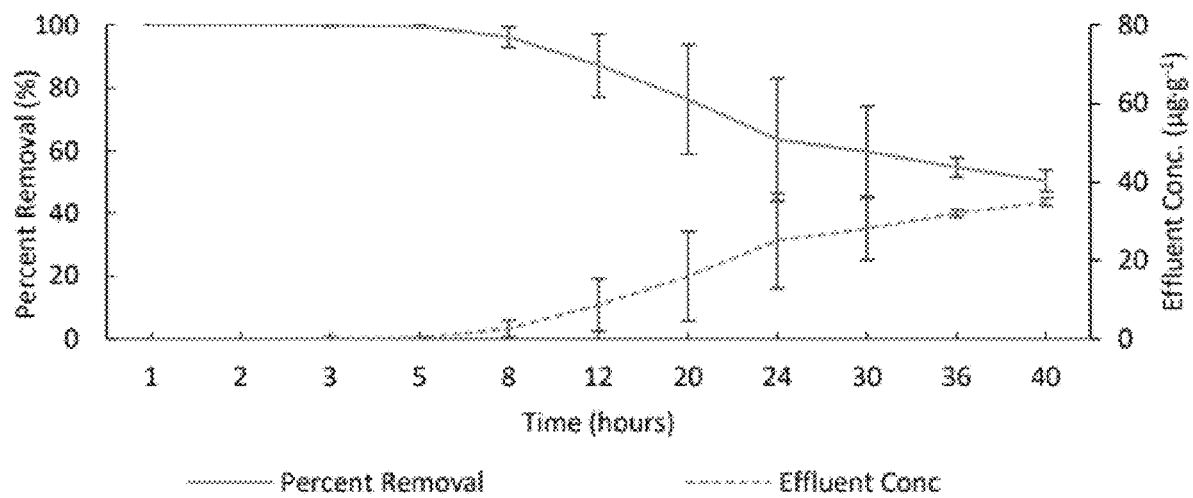
FIG. 5C is a graphical depiction of MC-LR removal curves for a biochar-, zero-valent iron-, and perlite-based green environmental medium (BIPGEM-1) from a fixed bed column study with real canal water spiked to 70 $\mu g \cdot L^{-1}$ MC-LR as influent conditions, according to an embodiment of the present disclosure.

As shown in FIG. 5A, FIG. 5B, and FIG. 5C, in an embodiment, even though low saturated hydraulic conductivity may contribute to adsorption, if the conditions are very low. Accordingly, in this embodiment, the synergistic composition may be configured to remove about 90% of MC-LR from the water matrix (e.g., influent water) within the first 8 hours; in the subsequent hours, in an embodiment, the removal efficiency of the synergistic compound may reach about 50% after at least about 40 hours.

The following examples are provided for the purpose of exemplification and are not intended to be limiting.

EXAMPLES

Example #1

Adsorption Capacity and Thermodynamics for the Removal of MC-LR within a Water Matrix by the Synergistic Composition Experimental Methods Four green sorption media known as Clay-Perlite and Sand (CPS), Zero-valent-Iron- and Perlite-based Green Environmental Media (ZIPGEM), Biochar-zero-valent-Iron- and Perlite-based Green Environmental Media-1 (BI-PGEM-1) and Biochar-zero-valent-Iron- and Perlite-based Green Environmental Media-2 (BIPGEM-2) were subjected to an isotherm study with distilled (DI) water to first characterize the adsorption capacity of the sorption media. Subsequently, a fixed-bed column study with water collected from a canal (C-23) close to the Indian River Lagoon was utilized as an influent to investigate the MC-LR removal rates and removal mechanisms of the most promising sorption media.

The sorption media CPS is composed of 92% sand, 5% clay, and 3% perlite in percentage by volume. ZIPGEM is composed of 85% sand, 5% clay, 5% zero valent iron (ZVI), and 5% perlite in percent by volume. Both CPS and ZIPGEM were selected as control to investigate the differential effect of the inclusion of ZVI and biochar as media component. BIPGEM-1 is composed of 80% sand, 5% clay, 5% ZVI, 5% perlite, and 5% biochar in percentage by volume; BIPGEM-2 is composed of 60% sand, 5% clay, 5% ZVI, 5% perlite, and 25% biochar in percent by volume.

The physical and chemical characteristics of the media were investigated for a better interpretation of the media removal mechanism. The density and Brunauer-Emmett-Teller (BET) surface area were analyzed by EMSL Analytical Laboratory. The saturated hydraulic conductivity and porosity were determined in a geotechnical laboratory at the University of Central Florida (UCF). The point of zero charge (PZC) was measured at a chemical laboratory at UCF following the salt addition method (Bakatula et al., 2018; Mahmood et al., 2011). The chemical composition of the media and the individual components was measured at the Advanced Materials Processing and Analysis Center at UCF via an X-ray fluorescence (XRF) analysis.

The MC-LR standard solution utilized for the isotherm studies was acquired from Sigma-Aldrich in liquid form with a concentration of 2.5 mM. The MC-LR standard for the column studies was obtained from Cayman chemical in a solid form. The MC-LR standard was first dissolved in methanol in accordance with its solubility point of 10 mg·ml$^{-1}$. The formal name for the MC-LR is cyclo [2,3-didehydro-N-methylalanyl-D-alanyl-L-leucyl-(3S)-3-methyl-D-β-aspartyl-L-arginyl-(2S,3S,4E,6E,8S,9S)-3-amino-9-methoxy-2,6,8-trimethyl-10-phenyl-4,6-decadienoyl-D-γ-glutamyl], and its molecular formula is $C_{49}H_{74}N_{10}O_{12}$, shown in FIGS. 1A-1B.

A series of equilibrium isotherms were performed on the sorption media (i.e., CPS, ZIPGEM, BIPGEM-1 and BIPGEM-2) to determine its MC-LR adsorption capacity and the effect the coexistence of phosphate ($PO_4^{3-}$) or calcium ($Ca^{2+}$) has on the MC-LR removal potential and adsorption capacity. In the first equilibrium isotherm (denoted as Case 1 hereafter), 5 aliquant on Erlenmeyer Flask were set with 10 g of media and 250 ml of DI water spiked with MC-LR to different initial concentrations ranging from 5-350 $\mu g \cdot L^{-1}$ (5, 35, 50, 100, and 350 $\mu g \cdot L^{-1}$ denoted as Condition 1, Condition 2, Condition 3, Condition 4, and Condition 5, respectively). For BIPGEM-2 an additional condition (Condition 6) with a MC-LR concentration of 600 $\mu g \cdot L^{-1}$ MC-LR was included. In the second and third isotherm studies (denoted as Case 2 and Case 3, respectively, hereafter) the same protocol was followed; however, the initial conditions were modified by including $PO_4^{3-}$ to a concentration of 20 mg·L$^{-1}$ (i.e., Case 2) or $Ca^{2+}$ to a concentration of 30 mg·L$^{-1}$ (i.e., Case 3) across all influent conditions (See TABLE 1). The resultant solutions were shaken in a shaking platform for 24 hours at 160 rpm. At the conclusion of the shaking time the solutions were left to settle for 1 hour. Subsequently, duplicate water samples with 100 ml of the resultant solutions were collected in a plastic bottle to be delivered to an external lab for MC-LR analysis.

TABLE 1

|  | Case 1 | Case 2 | Case 3 |
|---|---|---|---|
| Control |  | 20 mg · L$^{-1}$ PO$_4^{3-}$ | 30 mg · L$^{-1}$ Ca$^{2+}$ |
| Condition 1 | 5 µg · L$^{-1}$ | 5 µg · L$^{-1}$ + 20 mg · L$^{-1}$ PO$_4^{3-}$ | 5 µg · L$^{-1}$ + 30 mg · L$^{-1}$ Ca$^{2+}$ |
| Condition 2 | 35 µg · L$^{-1}$ | 35 µg · L$^{-1}$ + 20 mg · L$^{-1}$ PO$_4^{3-}$ | 35 µg · L$^{-1}$ + 30 mg · L$^{-1}$ Ca$^{2+}$ |
| Condition 3 | 50 µg · L$^{-1}$ | 50 µg · L$^{-1}$ + 20 mg · L$^{-1}$ PO$_4^{3-}$ | 50 µg · L$^{-1}$ + 30 mg · L$^{-1}$ Ca$^{2+}$ |
| Condition 4 | 100 µg · L$^{-1}$ | 100 µg · L$^{-1}$ + 20 mg · L$^{-1}$ PO$_4^{3-}$ | 100 µg · L$^{-1}$ + 30 mg · L$^{-1}$ Ca$^{2+}$ |
| Condition 5 | 350 µg · L$^{-1}$ | 350 µg · L$^{-1}$ + 20 mg · L$^{-1}$ PO$_4^{3-}$ | 350 µg · L$^{-1}$ + 30 mg · L$^{-1}$ Ca$^{2+}$ |
| Condition 6* | 600 µg · L$^{-1}$ | 600 µg · L$^{-1}$ + 20 mg · L$^{-1}$ PO$_4^{3-}$ | 600 µg · L$^{-1}$ + 30 mg · L$^{-1}$ Ca$^{2+}$ |

*Condition 6 was studied by BIPGEM-2 only

Water samples delivered to the external laboratory were analyzed for total MC with a Liquid Chromatography-Mass Spectrometry/Mass Spectrometry (LC-MS/MS) following the MMPB (2R-methyl-3S-methoxy-4-phenylbutanoic acid) method (Foss et al. 2020). Guo et al. (2017) compared the analysis of MCs in drinking water by enzyme-linked immunoassay (ELISA) and LC-MS/MS method, finding that the LC-MS/MS results were more reliable than those from ELISA. An extra set of samples was collected and analyzed for PO$_4^{3-}$ or Ca$^{2+}$ concentration via Hach measuring kits. The Hach product TNT844 was utilized to analyze the samples for PO$_4^{3-}$, and the Hach product TNT869 was utilized to analyze the samples for Ca$^{2+}$ concentrations. Water samples analyzed for PO$_4^{3-}$ or Ca$^{2+}$ were previously filtered via a 0.45 µm membrane filter. To minimize the risk of the MC-LR adsorbing to the Erlenmeyer flask or sampling bottles, each of the flask and sampling bottles was rinsed 3 times with the spiked solution or the corresponding water sample prior to sample storage.

The different concentrations were selected given the wide range of concentrations at which MC-LR is found in different environments (e.g., a karst environment). For instance, the presence of MC-LR has been found in different drinking water sources or public reservoirs. In Sao Paulo, Brazil, concentrations ranging from 0.5-100 µg·L$^{-1}$ were found in a public reservoir (Nobre, 1997), while concentrations up to 1.25 µg·L$^{-1}$ were detected in Pará, in the Brazilian Amazonia (Vieira et al., 2005). Different aquatic systems have also been affected with high concentrations of MC; for instance, the concentrations of MC-LR in the Indian River Lagoon in the state of Florida ranged from 0.01-85.70 µg·L$^{-1}$ between 2018 and 2019, with higher concentration detected during the wet season (May to October) (Laureano-Rosario et al., 2021). Moreover, Billam et al. (2006) reported MC-LR concentration in 2 lakes in Texas with concentrations ranging from 0.096-4.914 µg·L$^{-1}$ in Buffalo Spring Lake and 0.2-5.83 µg·L$^{-1}$ in Lake Ransom Canyon, and in both lakes higher concentrations were observed during the spring season. The issue with high concentrations of MC extends outside of the USA; for instance, in Beira Lake in Sri Lanka, MC-LR concentrations varied from 11,450-25,230 µg·L$^{-1}$, with higher concentration targeted within the rainy season (Piyathilaka and Manage 2017).

Data collected for MC-LR concentration at different influent conditions were analyzed in terms of percentage removal as well as for its absorption capacity by the Langmuir and Freundlich isotherm models. The Langmuir isotherm is widely used to explore the adsorption capacity of different sorption materials (Languir, 1932; Ho and Chiang, 2001). Different linearization of the Langmuir model can be found in literature; however, Guo and Wang (2019) suggested that the linear form presented in Equation 2 can better estimate the Langmuir parameters. In this equation the parameter $q_e$ is the amount of sorbate adsorbed per unit weight (µg·g$^{-1}$) of the sorption media, and it can be calculated following Equation 3. In Equation 3, m is the mass of the sorption media in grams, $C_o$ is the initial concentration on the solution in µg·L$^{-1}$, $C_e$ is the concentration of the solution at equilibrium in µg·L$^{-1}$, and V is the volume of the solution in L. Moreover, the Langmuir parameters $K_L$ and $q_m$ correspond to the Langmuir equilibrium constant (L·µg$^{-1}$) and the maximum adsorption capacity of the absorbent (µg·g$^{-1}$), respectively, and are retrieved from the regression plot of $$\frac{C_e}{q_e} \text{ vs. } C_e.$$

$$q_e = \frac{q_m K_L C_e}{1 + K_L C_e} \qquad \text{Eq. 1}$$

$$\frac{C_e}{q_e} = \frac{1}{q_m} C_e + \frac{1}{K_L q_m} \qquad \text{Eq. 2}$$

$$q_e = \frac{(C_o - C_e)V}{m} \qquad \text{Eq. 3}$$

The Freundlich isotherm model is an empirical equation, and its nonlinear form is presented in Equation 4, while one of the most common linear forms is presented in Equation 5 (Freundlich, 1909; Appel, 1973). The linear form of the Freundlich equation is obtained from the linear regression ln $q_e$ vs. ln $C_e$, where the slope of the line is 1/n and the $K_F$ is calculated from the x-interception. The 1/n parameter indicates the adsorption intensity where the adsorption is favorable if 1/n is between 0 and 1 (0<1/n<1), yet if 1/n is greater than 1 (1/n>1) then the adsorption is unfavorable.

$$q_m = K_F C_e^{\frac{1}{n}} \qquad \text{Eq. 4}$$

$$\ln q_e = \frac{1}{n} \ln C_e + \ln K_F \qquad \text{Eq. 5}$$

The thermodynamic parameters including Gibbs free energy (ΔG), enthalpy change ΔH° and entropy change 4S can aid in the explanation of the MC-LR removal mechanism by the sorption media. To determine these parameters a series of series of batch tests were performed with aliquots with 10 grams of media and 250 ml of DI water spike to Condition 5 for the three cases (Case 1, 2 and 3) at three different temperatures (17° C., 23° C. and 35° C.) The same shaking and analysis protocol as the equilibrium isotherms was followed as described in greater detail above.

The thermodynamic parameters can be determined from the Van't Hoff Equation (Eq. 6) and the change in Gibbs free energy (ΔG) which can described in the form of Eq. 7. Where keg is the equilibrium constant and can be calculated following Eq. 8. The $\Delta S°$ is the standard entropy change (J/mol K), $\Delta H°$ is the standard enthalpy change (KJ/mol) and $\Delta G°$ is the standard Gibbs free energy change (KJ/mol). When $\Delta S°$ is positive value it signifies affinity of adsorbent towards the aqueous solution, while a negative value relates to a lower affinity for adsorption. The change in enthalpy (ΔH) characterizes the total changes in bond energy between the adsorbent and adsorbate. For $\Delta H°$ an endothermic and exothermic reaction is represented by a positive and negative value, respectively. Moreover, a non-spontaneous and spontaneous reaction is inferred from a positive and negative value of ΔG, respectively.

$$\Delta G^0 = \Delta H^0 - T\Delta S^0 \quad \text{Eq. 6}$$

$$\Delta G^0 = -RT\ln k_{eq} \quad \text{Eq. 7}$$

$$K_{eq} = \frac{q_e}{C_e} \quad \text{Eq. 8}$$

Data obtained from the isotherm studies were subjected to a 1-way and a 2-way Analysis of Variance (ANOVA) test without replication with the data analysis module in Microsoft Excel. The one-way ANOVA was taken to verify if the differences in removal efficiency among the different sorption media (i.e., CPS, ZIPGEM, BIPGEM-1 and BIPGEM-2) at the various influent cases were significant under a 95% confidence interval. The 2-null hypothesis ($H_0$) and 2 alternative hypotheses ($H_a$) to be tested are as follows:

$H_0$: There is not a significant difference in the removal efficiency means between sorption media.

$H_a$: There is a significant difference in the removal efficiency between sorption media.

A 2-way ANOVA test was applied to the removal efficiency of each media at different influent conditions and cases to verify if the differences in removal efficiency are significant under a 95% confidence interval. The assumption considered by the 2-way ANOVA includes the homogeneity of variance, independence of observations, and normally distributed dependent variables, and the data should not have significant outliers (Knežević and muk, 2021). The 2-null hypotheses ($H_{01}$, $H_{02}$) and 2 alternative hypotheses ($H_{a1}$, $H_{a2}$) to be tested are presented as follows:

$H_{01}$: There is not a significant difference in the average removal efficiencies among the different initial influent MC-LR concentrations (i.e., Conditions 1-5 or Conditions 1-6) for CPS, ZIPGEM, BIPGEM-1 and BIPGEM-2. ($H_{a1}$: There is a significant difference in the average removal efficiencies among the different initial influent MC-LR concentrations (i.e., Conditions 1-5 or Conditions 1-6) for CPS, ZIPGEM, BIPGEM-1, and BIPGEM-2.)

$H_{02}$: There is not a significant difference in the average removal efficiencies among the different cases (i.e., Cases 1, 2, and 3) for CPS, ZIPGEM, BIPGEM-1, and BIPGEM-2 ($H_{a2}$: There is a significant difference in the average removal efficiencies among the different cases (i.e., Cases 1, 2, and 3) for CPS, ZIPGEM, BIPGEM-1, and BIPGEM-2.)

The acceptance or rejection of the null hypotheses was determined by comparison of the F and $F_{crit}$ values. If the F value was greater than the $F_{crit}$ value, then the null hypothesis was rejected and the alternative hypothesis was chosen.

A fixed-bed column study for CPS, ZIPGEM and BIPGEM-1 was performed to collect information on its removal efficiency and adsorption capacity for MC-LR treatment in a dynamic environment (e.g., a karst environment). The experimental setup consisted of a polyvinyl chloride column of 12.7 cm depth (5 inches) and 10.2 cm (4 inches) diameter in triplicate for each sorption media. Each column contained a filter and layer of pebbles at the bottom to prevent clogging, followed by 1,300 mL of media (i.e., CPS, ZIPGEM, BIPGEM-1) and topped with a layer of pebbles to aid in water distribution at the surface of the column. The column was operated in a downflow manner with peristaltic pump to provide a constant flowrate of 14 mL·min$^{-1}$. Each column has 1,300 ml of media. The hydraulic loading rate is 2,517 1·day$^{-1}$·m$^{-2}$ (60.939 gallons·day$^{-1}$·ft$^{-2}$). The influent consisted of spiked surface water at a concentration of 70 μg·L$^{-1}$ of MC-LR that reflects the typical high range of MC-LR concentrations in natural environments (e.g., a karst environment). The media reach 50% breakthrough at 40 hours (50% removals were obtained at this point).

Water samples were collected at different times to capture the breakthrough curve of CPS, ZIPGEM and BIPGEM-1 for MC-LR adsorption. The collected water samples were delivered to Green Water laboratory for analysis for total MC with a LC-MS/MS. Moreover, a set of triplicate samples collected from surface water was sent to Eurofins Flowers Chemical Laboratories, Inc. for analysis of basic water parameters (i.e., dissolved iron, dissolved aluminum, nitrogen Kjeldahl, nitrate, nitrite, total nitrogen, total phosphorus, and chlorophyll a). A separate set of triplicate water samples was sent to ALS testing laboratories to test the concentration of tannic acid in the water.

Information on the breakthrough curve for all sorption media (i.e., CPS, ZIPGEM and BIPGEM-1) was imputed into 2 dynamic models, namely Thomas and Modified Dose-Response (MDR) model. The Thomas model is commonly used to produce a general analysis of the adsorption process in a fixed bed column. The Thomas model was developed based on the Langmuir isotherm equilibrium and second-order reversible kinetics (González-López et al., 2021). The linear form of the Thomas model is presented in Equation 6 and can be obtained from the linear regression of $$\ln\left(\frac{C_o}{C_t} - 1\right) \text{ vs. } t,$$

where t is time in minutes; $C_o$ and $C_t$ are the influent MC-LR concentration and the effluent concentration at time t in μg·L$^{-1}$, respectively; m is the mass of media along the fixed bead in grams; Q is the influent flow rate in L·min$^{-1}$; $K_T$ is the Thomas constant in L·minutes$^{-1}$·μg$^{-1}$; and $q_o$ is the maximum adsorption capacity of the media in μg·L$^{-1}$.

$$\ln\left(\frac{C_o}{C_t} - 1\right) = \frac{K_T q_o m}{Q} - K_T C_o t \quad \text{Eq. 9}$$

Figure 2:
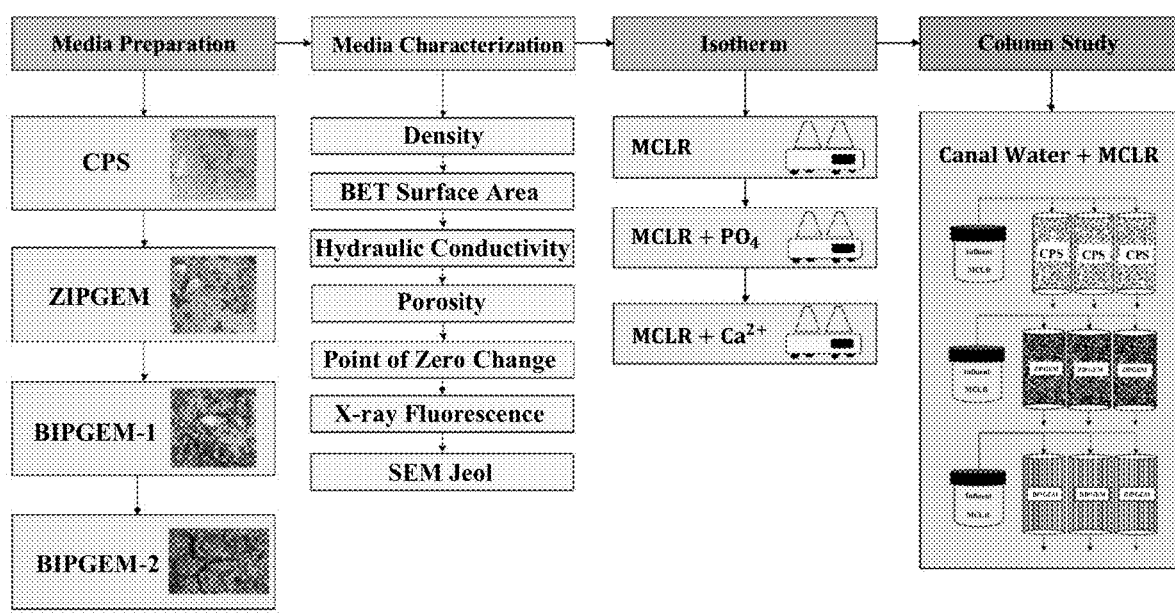
FIG. 2 depicts filter composition materials and different filtration media, according to an embodiment of the present disclosure.

The MDR model is an empirical model, which is more suitable for asymmetric breakthrough curves and thus minimizes the error from the Thomas model (Song et al., 2011). The linear form of the MDR model is presented in Equation 7; from this equation the constants $C_t$, $C_o$, Q, m, $q_o$, and t keep the same meaning and units as in the Thomas model, however, the constant $a_{mdr}$ corresponds to the MDR constant (unitless). An embodiment of the fixed-bed column study is shown in FIG. 2.

$$\ln\left(\frac{C_t}{C_o - C_t}\right) = a_{mdr}\ln(C_o Qt) - a_{mdr}\ln(q_o m) \qquad \text{Eq. 10}$$

Results

The characteristics of the sorption media CPS, ZIPGEM, BIPGEM-1, and BIPGEM-2 are summarized in TABLE 2. The results indicate that the sorption media BIPGEM-2 has the highest BET (Brunauer-Emmett-Teller) surface area, followed by ZIPGEM, BIPGEM-1 and CPS. ZIPGEM has the highest saturated hydraulic conductivity followed by CPS, BIPGEM-1, and BIPGEM-2, respectively. The difference in the physical characteristics among CPS, ZIPGEM, BIPGEM-1 and BIPGEM-2 can be attributed to the inclusion of ZVI or ZVI and biochar as media components and the different media matrices. A larger surface area and higher porosity can be beneficial for adsorption processes because it can provide more active sites (Bhatnagar and Jain, 2005; Rong et al., 2017; Subramaniam et al., 2017), while a lower saturated hydraulic conductivity can be beneficial for adsorption process because it extends the contact time of the media and the adsorbate. However, a lower density can be beneficial for application purposes given the inverse relationship between density and volume (pore space).

TABLE 2

| Name | Density (g · cm$^3$) | BET Surface Area (m$^2$ · g$^{-1}$) | Saturated Hydraulic Conductivity (m · sec$^{-1}$) | PZC (±Stdev) |
|---|---|---|---|---|
| CPS | 2.61 | 1.08 | 1.7(10$^{-4}$) | 5.6 ± 0.22 |
| ZIPGEM | 2.78 | 1.50 | 2.8(10$^{-4}$) | 9.2 ± 0.33 |
| BIPGEM-1 | 2.59 | 1.35 | 1.2(10$^{-4}$) | 9.6 ± 0.06 |
| BIPGEM-2 | 2.67 | 3.08 | 0.6(10$^{-4}$) | 10.0 ± 0.4 |
| Biochar | 1.18 | 371.11 | 1.1(10$^{-4}$) | 10.6 ± 0.01 |

The chemical elemental composition of the different components of the media matrix were explored by an XRF instrument to explore what the chemical composition of each material that can contribute to the removal mechanism of the green sorption media (See TABLE 3). The main component of these green sorption media is sand, followed by clay and perlite, whereas ZVI is a component of ZIPGEM, BIPGEM-1 and BIPGEM-2 and biochar is a component of BIPGEM-1 and BIPGEM-2. Sand is made of ~91% Si, and clay (the second main component in the all-media matrix) is made of ~38% and ~52% Al and Si, respectively. The composition of perlite is mainly Si, K, and Al, accounting for ~57%, ~19%, and ~9%, respectively. ZVI is composed of ~95% of Fe, while the main components of biochar are Ca and K, accounting for ~50.9% and ~23.8% respectively.

TABLE 3

| | Sand | | Clay | | Perlite | | ZVI | | Biochar | |
|---|---|---|---|---|---|---|---|---|---|---|
| Element | Conc | Unit | Conc | Unit | Conc | Unit | Conc | Unit | Conc | Unit |
| Al | 2.3 ± (0.4) | % | 37.7 ± (0.1) | % | 9.3 ± (0.5) | % | 0.4 ± (0.3) | % | — | % |
| Si | 90.9 ± (3.2) | % | 51.6 ± (0.1) | % | 57.0 ± (1.7) | % | 0.7 | % | 2.7 | % |
| P | 2.0 ± (0.1) | % | 1.5 | % | 2.2 ± (0.1) | % | 0.5 | % | 1.9 | % |
| S | 0.4 ± (0.3) | % | 0.5 | % | 1.3 ± (0.2) | % | — | % | 0.9 | % |
| Cl | 1.6 ± (1.1) | % | 1.5 | % | 1.7 ± (0.1) | % | 0.5 | % | 2.3 | % |
| K | 2.1 ± (0.2) | % | 0.8 | % | 19.3 ± (1.4) | % | — | % | 23.8 | % |
| Ca | 0.9 ± (0) | % | 1 | % | 6.1 ± (0.1) | % | 0.3 | % | 50.9 | % |
| Ti | 0.9 ± (0.6) | % | 1.7 | % | 0.2 | % | — | % | 1.6 | % |
| Fe | 0.3 ± (0.1) | % | 3.6 | % | 2.4 ± (0.1) | % | 95.6 ± (0.2) | % | 13 | % |
| Cr | — | — | — | — | — | — | 0.3 | % | 0.1 | % |
| Mn | — | — | — | — | 0.3 | % | 0.5 | % | 2.1 | % |
| Ni | — | — | — | — | — | — | 0.4 | % | — | % |
| Cu | — | — | — | — | — | — | 0.5 | % | 0.4 | % |
| Zn | — | — | — | — | — | — | 0.3 | % | 0.2 | % |
| Sr | — | — | — | — | — | — | — | — | 0.1 | % |

In TABLE 4, the chemical elemental composition for CPS, ZIPGEM, BIPGEM-1, and BIPGEM-2 is presented. The major difference in the elemental composition among the media is the presence of Fe in ZIPGEM, BIPGEM-1, and BIPGEM-2 in comparison to CPS. In ZIPGEM, BIPGEM-1, and BIPGEM-2, Fe accounts for ~12.1%, ~12.8% and ~5.6%, respectively of the media's chemical elemental composition, in comparison to CPS, in which Fe only accounts for ~0.4% of its elemental composition. With the increased Fe percentage in ZIPGEM, the percentage of Si decreases as evidence of the lower content of sand in ZIPGEM, BIPGEM-1, and BIPGEM-2.

TABLE 4

| CPS | | | ZIPGEM | | | BIPGEM-1 | | | BIPGEM-2 | | |
|---|---|---|---|---|---|---|---|---|---|---|---|
| Element | Conc | Unit | Element | Conc | Unit | Element | Conc | Unit | Element | Conc | Unit |
| Al | 10.5 ± (0.7) | % | Al | 8.4 ± (0.9) | % | Al | 11.5 ± (0.1) | % | Al | 9.3 ± (0.7) | % |
| Si | 80.1 ± (1.6) | % | Si | 70.3 ± (2) | % | Si | 70.4 ± (0.2) | % | Si | 80.5 ± (0.8) | % |
| P | 2.1 ± (0.2) | % | P | 1.9 ± (0.1) | % | P | 1.4 ± (0) | % | P | 0.7 ± (0) | % |

TABLE 4-continued

| | CPS | | | ZIPGEM | | | BIPGEM-1 | | | BIPGEM-2 | | |
|---|---|---|---|---|---|---|---|---|---|---|---|---|
| Element | Conc | Unit | Element | Conc | Unit | Element | Conc | Unit | Element | Conc | Unit |
| S | 0.6 ± (0.1) | % | S | — | % | S | — | % | S | — | % |
| Cl | 1.8 ± (0.2) | % | Cl | 2.0 ± (0.2) | % | Cl | 1.3 ± (0) | % | Cl | 0.45 ± (0) | % |
| K | 2.9 ± (0.8) | % | K | 2.8 ± (0.4) | % | K | 0.6 ± (0) | % | K | 1.4 ± (0.2) | % |
| Ca | 1.1 ± (0.2) | % | Ca | 1.0 ± (0.1) | % | Ca | 1.1 ± (0) | % | Ca | 1.17 ± (0.2) | % |
| Ti | 0.4 ± (0.1) | % | Ti | 1.3 ± (0.2) | % | Ti | 0.7 ± (0.2) | % | Ti | 0.69 ± (0) | % |
| Fe | 0.4 ± (0.1) | % | Fe | 12.1 ± (1.2) | % | Fe | 12.8 ± (0.2) | % | Fe | 5.6 ± (1.1) | % |

Figure 3A:
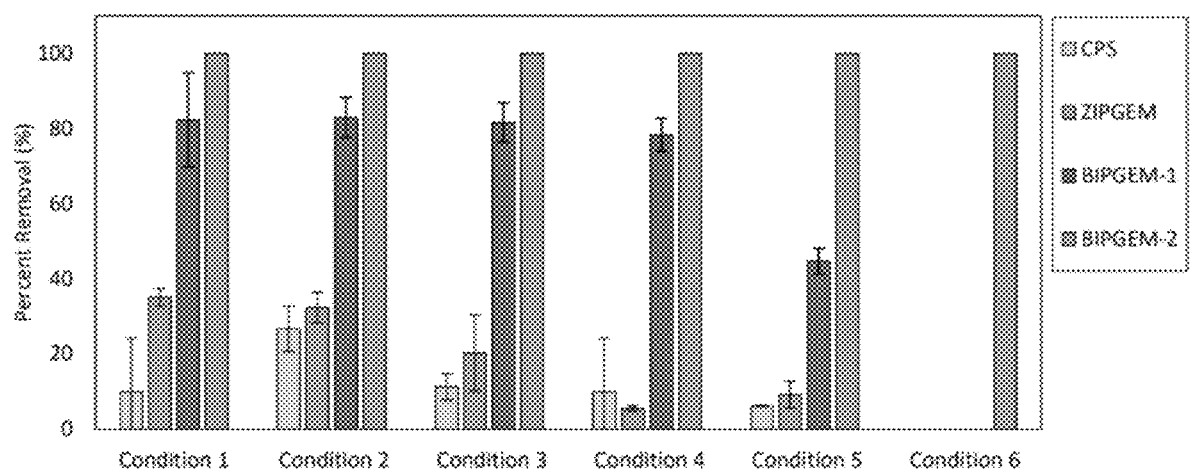
FIG. 3A graphically compares MC-LR removal for four filtration media, according to an embodiment of the present disclosure.
Figure 3B:
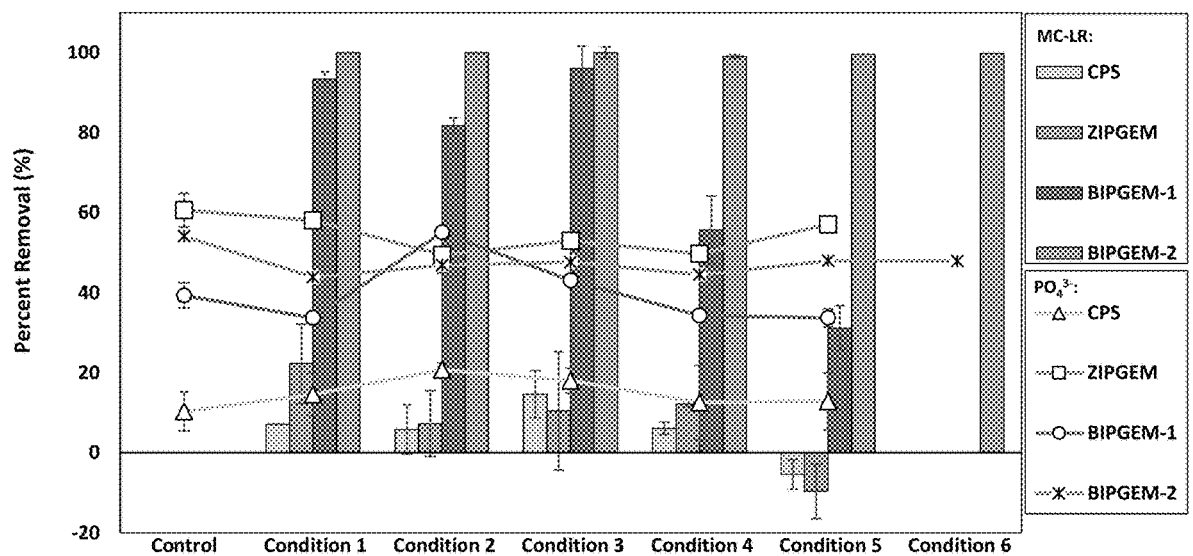
FIG. 3B graphically compares MC-LR and phosphate removal for four filtration media, according to an embodiment of the present disclosure.
Figure 3C:
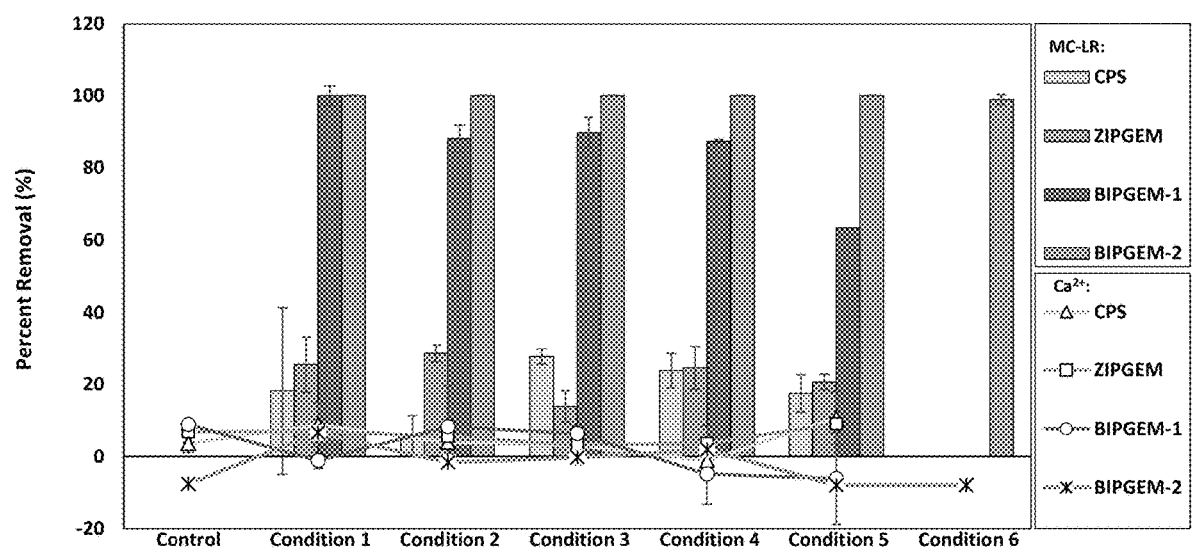
FIG. 3C graphically compares MC-LR and calcium removal for four filtration media, according to an embodiment of the present disclosure.

A series of isotherm studies were performed to understand the removal efficiency and the effect that different influent concentrations have on the MC-LR removal by the different sorption media (i.e., CPS, ZIPGEM, BIPGEM-1, and BIPGEM-2). Additionally, 3 different cases were selected to investigate the effect that the coexistence of $PO_4^{3-}$ and $Ca^{2+}$ has on the MC-LR removal efficiency of sorption media. In Case 1, MC-LR alone was spiked in the influent at different concentrations, while in Case 2, $PO_4^{3-}$ at a constant concentration was spiked in the influent with varying MC-LR concentrations and in Case 3, $Ca^{2+}$ at a constant concentration was included along the spiked influents with different MC-LR concentrations. The different influent concentrations ranged from 5-600 $\mu g \cdot L^{-1}$ and are denoted as Condition 1-6 as explained in TABLE 1. In general, in Case 1, Case 2, and Case 3 (See FIGS. 3A-3C), a trend can be observed with decreasing MC-LR removal efficiency as the concentration of MC-LR in the influent increases. The highest MC-LR removal efficiencies were obtained by BIPGEM-2, ranging between 98 to 100% across all cases, followed by BIPGEM-1, ZIPGEM, and CPS, respectively. For instance, in Case 1 the removal efficiencies of BIPGEM-1 ranged from 44.6-82.9%, while in Case 2 and Case 3 the removal efficiencies ranged from 29.5-91.7% and 63-100%, respectively. For ZIPGEM and CPS the removal efficiencies were lower. In Case 1 the removal efficiencies of ZIPGEM and CPS ranged between 9% and 35% and 6.1% and 26.7%, respectively. In Case 2, the removal efficiencies ranged between 0% and 22% for ZIPGEM and between 0% and 14.6% for CPS. Finally, in Case 3 the removal efficiencies attained by ZIPGEM and CPS ranged from 20.6-28.6% and 6-27.7%, respectively.

In Case 2, the simultaneous removal of MC-LR and phosphorus was studied, and it was observed that ZIPGEM outperformed the other sorption media in terms of phosphate removal, with removals ranging from 49.4-60.6%. The $PO_4^{3-}$ removal by BIPGEM-2 ranged from 43.9-54.09%, while for BIPGEM-1 it ranged from 33.7-43.13%. Lower $PO_4^{3-}$ removal was obtained by CPS ranging between 10.3-20.6%. In Case 3, occurrence of $Ca^{2+}$ was studied, and no significant change in the effluent concentration, in comparison to the influent concentration, was observed among the 4 different sorption media.

The MC-LR percentage removals obtained by each sorption media in each case were subject to a 1-way ANOVA at a 95% critical interval. By comparing the resultant F and $F_{crit}$ values, it was concluded that there is a significant difference among the mean values of these removal efficiencies across the 4 green sorption media. This conclusion was attained via the acceptance of the alternative hypothesis.

Furthermore, the percentage removals across the 3 different cases (i.e., Cases 1, 2, and 3) and conditions (i.e., Conditions 1-5 or Conditions 1-6) within each media were further compared by a 2-way ANOVA test with a 95% critical interval. The test was performed to determine if there was a significant difference among the MC-LR percentage removals attained at the different cases and conditions within each media. The acceptance or rejection of the null hypothesis was determined based on the comparison of the F and $F_{crit}$ value. For BIPGEM-2, ZIPGEM, and CPS, both null hypotheses ($H_{01}$ and $H_{02}$) were accepted, leading to the conclusion that there were not significant differences in the MC-LR percentage removals obtained among the different MC-LR influent concentrations and cases. On the contrary, for BIPGEM-1 the first null hypothesis was rejected ($H_{01}$), allowing for acceptance of the first alternative hypothesis, leading to the conclusion that there were significant differences across MC-LR percentage removals attained by the different influent MC-LR conditions (Condition 1-5). Moreover, for BIPGEM-1, the second null hypothesis was accepted, generating the conclusion that there were not significant differences in the MC-LR removals across the different cases.

To further characterize the MC-LR adsorption capacity of the sorption media (i.e., CPS, ZIPGEM, BIPGEM-1, and BIPGEM-2), the isotherm results were imputed into the Langmuir and Freundlich isotherm models, and the results are presented in TABLE 5 and TABLE 6. High correlation efficiencies ($R^2$) were obtained for CPS, ZIPGEM, and BIPGEM-1 from the linear regression following the Freundlich isotherm, while for BIPGEM-2 $R^2$ was only observable in Case 1. For the Langmuir isotherm model, high value of $R^2$ was only obtained from the linear regression of BIPGEM-1 (all cases) and CPS and BIPGEM-2 in Case 1, and an acceptable $R^2$ was obtained for ZIPGEM case 1. The low $R^2$ for CPS, ZIPGEM, and BIPGEM-2 in Case 2 and Case 3 can be explained by the first and second assumption of the Langmuir isotherm that states that the adsorption is entirely of a monolayer at the surface and that only one adsorbed molecule can be adsorbed at each site. Considering these results, it can be concluded that for CPS and ZIPGEM the adsorption is monolayer on homogeneous sites when MC-LR is alone in the influent, whereas, when MC-LR coexists with other contaminants (i.e., $PO_4^{3-}$ and $Ca^{2+}$), the adsorption is multilayer on heterogeneous sites according to the assumption of the Freundlich isotherm model. Such conclusion cannot be made for BIPGEM-1, given that high $R^2$ were attained from the linear regression of both Langmuir and Freundlich models.

TABLE 5

| Media | Condition | $R^2$ | Equation | Parameter |
|---|---|---|---|---|
| CPS | Case 1 | 0.841 | y = 1.348x + 155.9 | $K_T = 0.009$ |
|  |  |  |  | $q_m = 0.74\ \mu g \cdot g^{-1}$ |
|  | Case 2 | 0.005 | y = −0.363x + 498.08 | $K_T = -0.0007$ |
|  |  |  |  | $q_m = -2.75\ \mu g \cdot g^{-1}$ |
|  | Case 3 | 0.045 | y = −0.433x + 341.65 | $K_T = -0.433$ |
|  |  |  |  | $q_m = -2.31\ \mu g \cdot g^{-1}$ |
| ZIPGEM | Case 1 | 0.239 | y = 0.999x + 183.03 | $K_T = 0.005$ |
|  |  |  |  | $q_m = 1.00\ \mu g \cdot g^{-1}$ |
|  | Case 2 | 0.070 | y = 1.301x + 269.77 | $K_T = 0.0048$ |
|  |  |  |  | $q_m = 0.77\ \mu g \cdot g^{-1}$ |
|  | Case 3 | 0.017 | y = 0.062x + 136.56 | $K_T = 0.0005$ |
|  |  |  |  | $q_m = 16.13\ \mu g \cdot g^{-1}$ |
| BIPGEM-1 | Case 1 | 0.999 | y = 0.216x + 7.35 | $K_T = 0.0294$ |
|  |  |  |  | $q_m = 4.63\ \mu g \cdot g^{-1}$ |
|  | Case 2 | 0.854 | y = 0.1473x + 7.10 | $K_T = 0.0207$ |
|  |  |  |  | $q_m = 6.79\ \mu g \cdot g^{-1}$ |
|  | Case 3 | 0.951 | y = 0.1265x + 4.489 | $K_T = 0.028$ |
|  |  |  |  | $q_m = 7.91\ \mu g \cdot g^{-1}$ |
| BIPGEM-2 | Case 1 | 1 | y = 0.0339x + 0.0188 | $K_T = 1.8032$ |
|  |  |  |  | $q_m = 29.49\ \mu g \cdot g^{-1}$ |
|  | Case 2 | 0.005 | y = 0.0542x + 0.1645 | $K_T = 0.329$ |
|  |  |  |  | $q_m = 18.45\ \mu g \cdot g^{-1}$ |
|  | Case 3 | — | — | $q_e^* = 16.9\ \mu g \cdot g^{-1}$ |

*adsorption at equilibrium from Influent 6 (687 $\mu g \cdot L^{-1}$ MC-LR)
**zero values in the effluent were excluded from the regression plots

TABLE 6

| Media | Condition | $R^2$ | Equation | Parameter |
|---|---|---|---|---|
| CPS | Case 1 | 0.893 | y = 0.795x − 4.748 | $K_F = 0.009$ |
|  |  |  |  | n = 1.258 |
|  | Case 2 | 0.900 | y = 1.066x − 6.3315 | $K_F = 0.002$ |
|  |  |  |  | n = 0.938 |
|  | Case 3 | 0.802 | y = 0.987x − 5.423 | $K_F = 0.004$ |
|  |  |  |  | n = 1.013 |
| ZIPGEM | Case 1 | 0.771 | y = 0.5852x − 3.7661 | $K_F = 0.023$ |
|  |  |  |  | n = 1.709 |
|  | Case 2 | 0.864 | y = 0.694x − 4.679 | $K_F = 0.009$ |
|  |  |  |  | n = 1.442 |
|  | Case 3 | 0.950 | y = 0.9722x − 4.699 | $K_F = 0.009$ |
|  |  |  |  | n = 1.061 |
| BIPGEM-1 | Case 1 | 0.917 | y = 0.6332x − 1.6424 | $K_F = 0.194$ |
|  |  |  |  | n = 1.579 |
|  | Case 2 | 0.852 | y = 0.4782x − 0.977 | $K_F = 0.376$ |
|  |  |  |  | n = 2.091 |
|  | Case 3 | 0.964 | y = 0.5836x − 0.984 | $K_F = 0.374$ |
|  |  |  |  | n = 1.713 |
| BIPGEM-2 | Case 1 | 1 | y = 0.64x + 3.059 | $K_F = 0.047$ |
|  |  |  |  | n = 1.563 |
|  | Case 2 | 0.036 | y = −0.7548x + 1.632 | $K_F = 0.195$ |
|  |  |  |  | n = −1.325 |
|  | Case 3 | — | — | — |

The adsorption capacities in Case 1 for CPS. ZIPGEM. BIPGEM-1, and BIPGEM-2 obtained by the Langmuir model are 0.74 $\mu g \cdot g^{-1}$. 1 $\mu g \cdot g^{-1}$. 4.63 $\mu g \cdot g^{-1}$, and 29.49 $\mu g \cdot g^{-1}$, respectively. BIPGEM-2 had the higher adsorption capacity followed by BIPGEM-1. ZIPGEM, and CPS. Moreover, the n value derived from the Freundlich isotherm model indicates whether the adsorption is favorable or unfavorable. Based on the n values from CPS, the adsorption for Case 1 and Case 3 is favorable, while the adsorption in Case 2 is not favorable. On the contrary, for ZIPGEM, BIPGEM-1, and BIPGEM-2 the adsorption is favorable for all cases (Case 1, Case 2, and Case 3). The adsorption capacity of BIPGEM-1 and BIPGEM-2 are compared to different adsorbents in the literature and is summarized in TABLE 7.

TABLE 7

| Media | Adsorption capacity | Experimental setup | Reference |
|---|---|---|---|
| Coconut shell | 16.1 $mg \cdot g^{-1}$ | Varying amount of carbon | Huang et al. |
| Bituminous coal | 17.5 $mg \cdot g^{-1}$ | Initial concentration 250 $\mu g \cdot L^{-1}$ | (2007) |
| Wood | 83.3 $mg \cdot g^{-1}$ | pH of 7.5 and Temp. 25° C. |  |
|  |  | DI water |  |
|  |  | Langmuir |  |
| Peat | 0.255 $mg \cdot g^{-1}$ | Varying initial concentration | Sathishkumar |
|  |  | Concentration range 100-1000 $\mu g \cdot g^{-1}$ | et al. (2010) |
|  |  | pH of 3 |  |
|  |  | DI water |  |
|  |  | Langmuir |  |
| Iron oxide nanoparticles | 0.594 $mg \cdot g^{-1}$ | Adsorbent dose = 0.1, 1, 2, 3, and 4 $mg \cdot g^{-1}$ | Gao et al. (2012) |
|  |  | Initial concentration 250 $\mu g \cdot L^{-1}$ |  |
|  |  | pH of 7 and Temp. 25° C. |  |
|  |  | DI water |  |
|  |  | Langmuir |  |

TABLE 7-continued

| Media | Adsorption capacity | Experimental setup | Reference |
|---|---|---|---|
| Wood-based GAC | 26 mg · g$^{-1}$ | Adsorbent dose = 0, 1, 5, and 11 mg · L$^{-1}$<br>Initial concentration: 50 μg · g$^{-1}$<br>DI water | Villars et al. (2020) |
| Activated carbon | 0.357 mg · g$^{-1}$ | Varying amount of carbon: 0.01-0.05 g<br>Concentration range: 5-65 μg · L$^{-1}$<br>pH of 3-9<br>DI water<br>Langmuir | Mashile et al. (2018) |
| BIPGEM-1<br>BIPGEM-2 | 0.004-0.008 mg · g$^{-1}$<br><br>0.017-0.029 mg · g$^{-1}$ | Varying initial concentration<br>Concentration range: 5-600 μg · L$^{-1}$<br>pH of 7<br>DI water spiked with $PO_4^{3-}$ or $Ca^{2+}$<br>Langmuir | Present Invention |

Phosphate adsorption capacity ($q_e$) of the sorption media CPS, ZIPGEM, BIPGEM-1, and BIPGEM-2 is presented in TABLE 8, along with the shared phosphate adsorption capacity, when MC-LR is present in the water matrix ($q_{e,shared}$). The phosphate adsorption capacity of BIPGEM-1 was the least affected by the presence of MC-LR as the $q_e$ and $q_{e,shared}$ estimated is 0.210 and 0.123 mg·g$^{-1}$, respectively. For both, ZIPGEM and BIPGEM-1, the $q_e$ reduced by about 0.038 and 0.044 mg·g$^{-1}$ respectively, in the presence of MC-LR. The decrease in the $q_e$, shared from the $q_e$ can be explained by a competition between phosphate and MC-LR for the available adsorption sites in the surface of the media. While, the $q_e$, shared slightly increases in CPS by 0.015 mg·g$^{-1}$. Given the low $q_e$ and a higher standard deviation in the $q_{e,shared}$ in CPS, such difference can be more relatable with a variation in the media phosphate adsorption capacity that with the effect by the presence of MC-LR. The maximum adsorption capacity of the sorption media ($q_o$) (i.e., CPS, ZIPGEM, BIPGEM-1, and BIPGEM-2) calculated by the Langmuir isotherm are presented in TABLE 5. In general, a decrease in the MC-LR $q_o$ of the sorption media was observed in Case 2, under the coexistence of MC-LR and phosphate, further implying a competition for the available sorption sites in the surface of the media.

TABLE 8

|  | CPS | ZIPGEM | BIPGEM-1 | BIPGEM-2 |
|---|---|---|---|---|
| $q_e$(mg · g$^{-1}$) | 0.055 (0.026) | 0.324 (0.022) | 0.210 (0.017) | 0.300 (0.010) |
| $q_{e,shared}$*(mg · g$^{-1}$) | 0.070 (0.045) | 0.286 (0.022) | 0.213 (0.046) | 0.256 (0.011) |

*the average $q_{e,shared}$ calculated at the different conditions were considered.
** number in parenthesis corresponds for the standard deviation.

The ΔG°, ΔH° and ΔS° are possible indicators of the nature of adsorption. Given the outperformance of BIPGEM-1 and BIPGEM-2 in the MC-LR adsorption capacity, the thermodynamic properties were further investigated. As shown in TABLE 9, the ΔH° values for BIPGEM-1 in all cases are positive, indicating that the adsorption is endothermic. While for BIPGEM-2, the ΔH° value indicated that the adsorption is exothermic when the water matrix contains only MC-LR, but when the water matrix phosphate or calcium the adsorption becomes endothermic. The endothermic nature of the MC-LR adsorption to biochar has previously been confirmed by Li et al., (2014). Given the increase in the MC-LR removal efficiency in BIPGEM-1 and BIPGEM-2 and the endothermic nature of the MC-LR adsorption to the sorption media, it can be suggested that the inclusion of biochar was the main contributor in the media for MC-LR removal. The ΔS° indicates affinity between the sorption media BIPGEM-1 and BIPGEM-2 and the aqueous solution. While ΔG° indicates that the MC-LR adsorption to BIPGEM-2 is spontaneous, and in the contrary the MC-LR adsorption to BIPGEM-1 is unspontaneous.

TABLE 9

|  |  |  |  | ΔG° (kJ/mol) | | |
|---|---|---|---|---|---|---|
|  |  | ΔH° (kJ/mol) | ΔS° (J/mol) | 17 C.° | 23 C.° | 35 C.° |
| BIPGEM-1 | Case 1 | 53.39 | 152.8 | 8.05 | 9.60 | 5.79 |
|  | Case 2 | 26.68 | 61.6 | 7.06 | 11.00 | 6.81 |
|  | Case 3 | 12.37 | 15.9 | 7.68 | 7.72 | 7.42 |

TABLE 9-continued

| | | ΔH° (kJ/mol) | ΔS° (J/mol) | ΔG° (kJ/mol) | | |
| --- | --- | --- | --- | --- | --- | --- |
| | | | | 17 C.° | 23 C.° | 35 C.° |
| BIPGEM-2 | Case 1 | −3.1 | 44.4 | −15.59 | −16.70 | −16.56 |
| | Case 2 | 32.3 | 151.6 | −15.27 | −7.277 | −16.22 |
| | Case 3 | 247.6 | 857.9 | 0.10 | −8.48 | −16.03 |

MC-LR in water at most pH (3<pH<12) is mostly negatively charged because of the deprotonation of the carboxyl group (Lawton et al., 2003; Lee and Walker, 2006). On the contrary, the surface charge of CPS, ZIPGEM, BIPGEM-1 and BIPGEM-2 are positively charged at pH below 5.6, 9.2, 9.6. and 10, respectively, in accordance with its PZC (See TABLE 2). The location of the PZC in ZIPGEM, BIPGEM-1 and BIPGEM-2 can be attributed to the presence of ZVI and ZVI and biochar as part of the sorption media matrix. This is because the location of PZC for iron hydroxide usually lies between 7 and 9 (Wu et al., 2017) and at pH of 10.6 for biochar. By considering the force of attraction between oppositely charged particles or Coulombic attraction, the higher adsorption capacity based on the Langmuir isotherm model for ZIPGEM, BIPGEM-1 and BIPGEM-2 in comparison to CPS can be justified (See TABLE 5). Previous researchers have explained the interactions between MC-LR and iron particles. For instance, the removal of MC-LR onto iron oxide nanoparticles was examined by Lee and Walker (2011), who concluded that pH strongly affected the adsorption of MC-LR, indicating that the adsorption of MC-LR increased with decreasing pH, thus contributing to the adsorption of MC-LR to iron oxide particles (maghemite) mainly via electrostatic interactions. Moreover, Gao et al. (2012) suggested that the adsorption of MC-LR to iron oxide nanoparticles was spontaneous and endothermic. Additionally, the presence of clay can further aid in the MC-LR adsorption capacity of the sorption media.

Figure 4A:
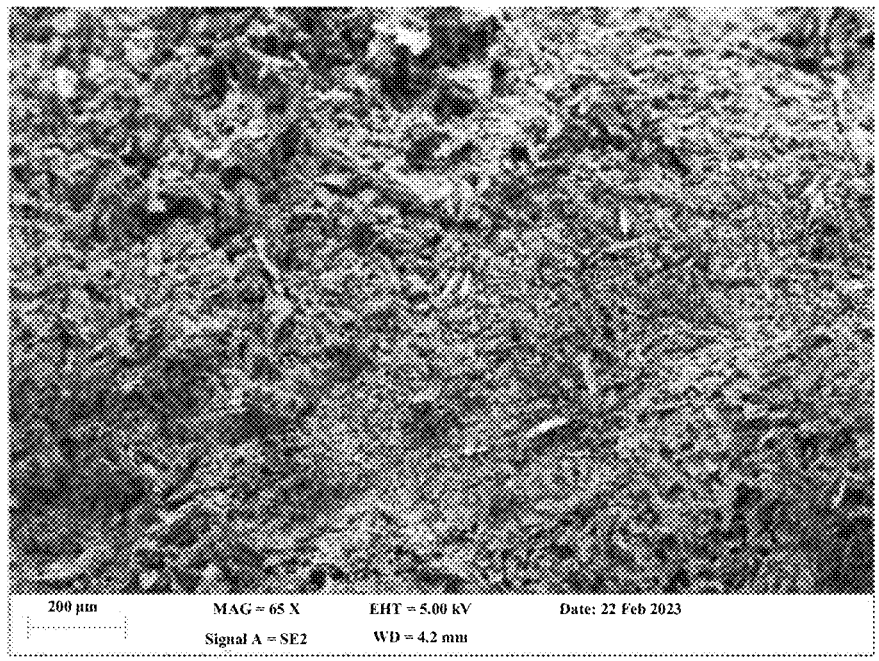
FIG. 4A depicts a scanning electron microscope (SEM) image of biochar at 65× magnification, according to an embodiment of the present disclosure.
Figure 4B:
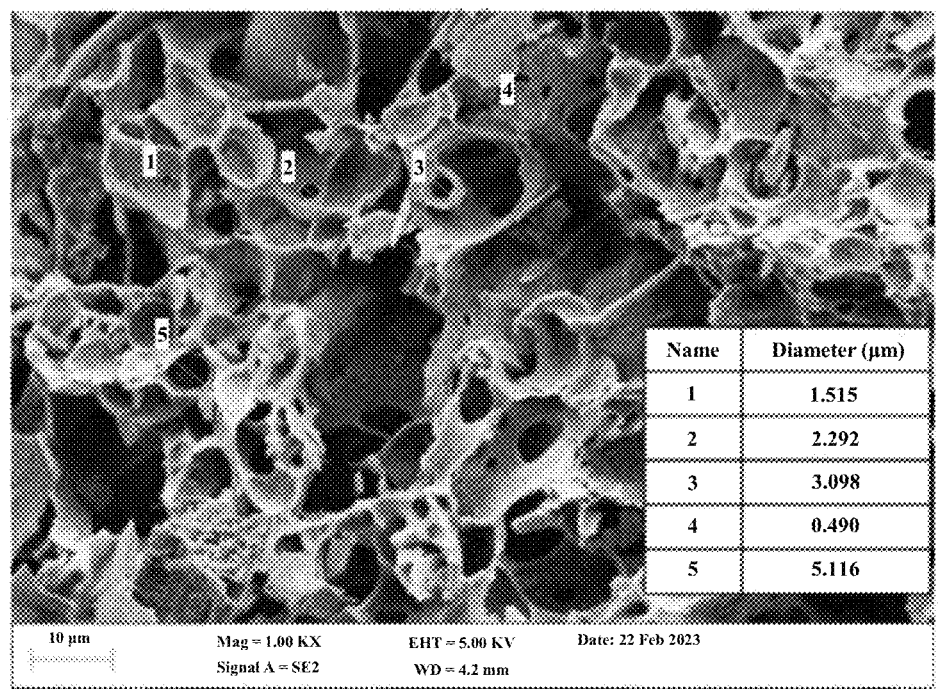
FIG. 4B depicts a SEM image of biochar at 1,000× magnification, according to an embodiment of the present disclosure.

The removal efficiency and adsorption capacity of BIPGEM-2 and BIPGEM-1 were the highest among all four tested sorption media, and such improvement can be attributed to the inclusion of biochar in the media. The adsorption of MC-LR to biochar was studied by Li et al. (2014), who found that the carboxylic and guanidino groups in the MC-LR structure can be responsible for the adsorption of MC-LR to biochar. Moreover, Li et al. (2014) also suggested that the adsorption of MC-LR to biochar is mainly attributed to the columbic attractions and the hydrogen bounding within the MC-LR and biochar surface. Liu et al. (2018) further indicated that the adsorption of MC-LR to biochar is the result of electrostatic attraction, pore filling, H bonding, and R-T interactions. Biochar was characterized in terms of surface morphology and PZC. The surface morphology of biochar is presented in FIGS. 4A-4B. For example, in FIG. 4A, it can be observed that the surface of biochar is porous. By zooming in (as shown in FIG. 4B), the pore size is characterized, resulting in diameters ranging from 0.49-5.2 µm. The morphology of biochar can support the improved MC-LR adsorption of BIPGEM-1 and BIPGEM-2 explained by the incorporation of pore-filling adsorption by biochar in the synergistic adsorption mechanism of BIPGEM-1 and BIPGEM-2.

In nature, MC-LR is commonly presented with other compounds including $PO_4^{3-}$ and $Ca^{2+}$; for this reason, it is important to understand how its presence can affect the removal efficiency of the sorption media. Based on the fitting of the Langmuir isotherm model, it can be assumed that when MC-LR is alone (Case 1) the adsorption of MC-LR in ZIPGEM and CPS is monolayer, whereas when MC-LR is present with other components (e.g., phosphate and calcium ions), the adsorption is multilayer. Moreover, based on the Freundlich equation, the major effect on the adsorption capacity was observed under the presence of $PO_4^{3-}$ for CPS because the n value indicated that the adsorption was not favorable. The larger PZC and better physical and chemical characteristics of ZIPGEM, BIPGEM-1, and BIPGEM-2 can explain whether in accordance with the Freundlich model, the adsorption was maintained as favorable in the presence of $PO_4^{3-}$. By comparing the percentage removal, in these different conditions prescribed, a decrease in the MC-LR removal rates in Case 2 for all sorption media (i.e., CPS, ZIPGEM, BIPGEM-1, BIPGEM-2) can be observed. Such a decrease in removal efficiency of different adsorbents has been previously observed, and it can be attributed to a competition effect of $PO_4^{3-}$ and MC-LR for the available positive adsorption sites (Li et al., 2014). However, the removal of $PO_4^{3-}$ was not affected by the presence of MC-LR, suggesting that the interaction in the surface media will favor $PO_4^{3-}$.

However, the presence of cations in the water matrix can enhance the removal of MC-LR, which was observed by comparing the removal efficiencies in Case 3 with the removals in Case 1 for all sorption media. In Case 2, the $Ca^{2+}$ removal was null, and the concentration maintained constant throughout the isotherm studies, regardless of the influent condition. Gao et al. (2012) suggested that calcium ions slightly enhanced the MC-LR adsorption capacity of the iron oxide nanoparticle. Meanwhile, Liu et al. (2019a) found that metal cation (i.e., $Ca^{2+}$) on clay surface altered MC-LR adsorption by strengthening the ligand exchange and electrostatic interactions favoring MC-LR adsorption onto surface of kaolinite at lower pH.

On the other hand, a decrease in the MC-LR removal efficiency of the sorption media is seen in the presence of $PO_4^{3-}$, an increase in the MC-LR removal efficiency when $Ca^{2+}$ is present in water can be observed. However, its difference is not statistically significant within 95% critical interval in accordance with a 2-way ANOVA. These results support the application of the sorption media in a field scale, especially with BIPGEM-1 due to its high simultaneous removal efficiency of MC-LR and $PO_4^{3-}$ and low production cost.

The dynamic removal efficiency of sorption media with canal water as influent condition was investigated to simulate the adsorption behavior on a field scale. The results of the MC-LR percentage removal by the sorption media CPS, ZIPGEM, and BIPGEM-1 are presented in FIG. 5A, FIG. 5B, and FIG. 5C, respectively. The sorption media BIPGEM-2 was excluded from the dynamic column study due to its low saturated hydraulic conductivity, with respect to the other sorption media. Even though low saturated hydraulic conductivity can contribute to adsorption, if the conditions are very low, they may not be appropriate for field implementation. The sorption media BIPGEM-1 achieved better MC-LR removal followed by ZIPGEM and CPS while maintaining a low production cost in comparison to BIPGEM-2. BIPGEM-1 removed over 90% of MC-LR from the influent water for the first 8 hours; in the subsequent hours, its removal efficiency decreased, reaching ~50% after ~40 hours. On the contrary, ZIPGEM media only achieved ~38% MC-LR removal within the first hour, reaching its exhaustion point (no removal efficiency) after 32 hours. As the control, CPS media only achieved 20% MC-LR removal in the first hour, reaching exhaustion after only 2 hours.

The results from the dynamic column studies for CPS, ZIPGEM, and BIPGEM-1 were imputed into the Thomas and MDR dynamic models, and the results are presented in TABLE 10. Given the short removal time for CPS, the MDR dynamic model was not applicable. Conversely, the adsorption capacity ($q_o$) of CPS predicted by the Thomas model was 0.15 µg·g$^{-1}$; however, given that the Thomas model is based on the Langmuir model, the $R^2$ obtained from the linear regression was low (0.35). For ZIPGEM, the Thomas and MDR models were applied, obtaining $R^2$ of 0.651 and 0.776, respectively. The $q_o$ value predicted for ZIPGEM by the Thomas model was 0.97 µg·g$^{-1}$ and by the MDR model was 0.016 µg·g$^{-1}$. The $R^2$ for BIPGEM-1 obtained by the Thomas and MDR models were 0.417 and 0.965, and the predicted $q_o$ values were 1.04 and 1.19 µg·g$^{-1}$, respectively. The lower $R^2$ from the Thomas model fitting can be associated with the assumption of monolayer adsorption in the Langmuir isotherm, which, based on the results of the isotherm study, is not a valid assumption when there are other elements in the water matrix.

tion capacities of four sorption media denoted as CPS, ZIPGEM, BIPGEM-1, and BIPGEM-2 for MC-LR at different water matrices were presented. The first advantage of these green sorption media is the low cost of operation and sustainable nature due to the use of recycled materials (e.g., ZVI and biochar). Additionally, these green sorption media have been proven to treat different pollutants simultaneously.

In terms of MC-LR adsorption capacity, the sorption media BIPGEM-2 outperformed BIPGEM-1, ZIPGEM, and CPS. The MC-LR adsorption capacity of BIPGEM-2, based on the Langmuir isotherm in Case 1, Case 2, and Case 3 was 29.29, 18.45, and 16.9 µg·g$^{-1}$, respectively. While, given the low production cost of BIPGEM-1, in comparison to BIPGEM-2, the MC-LR adsorption in a dynamic model was investigated and resultant $q_o$ is 1.19 µg·g$^{-1}$ based on the MDR dynamic model. The adsorption capacity of BIPGEM-1 in a dynamic environment (e.g., a karst environment) is comparable with other adsorbents in literature. For example, as shown in TABLE 11, it can be observed that the adsorption capacity of BIPGEM-1 is comparable with the adsorption capacity of GAC studied in a dynamic environment (e.g., a karst environment). The best performance of BIPGEM-2 and BIPGEM-1 for the MC-LR removal can be attributed to a large BET surface area, lower saturated hydraulic conductivity, high porosity, and the location of the PZC. Moreover, the inclusion of biochar in the media mix increases the MC-LR removal efficiency by its pore structure and high PZC in BIPGEM-1 and BIPGEM-2.

TABLE 10

| Media | Dynamic Model | $R^2$ | Equation | Parameters |
|---|---|---|---|---|
| CPS | Thomas | 0.350 | y = −0.005x + 0.1463 | $q_o$ = 0.15 µg · g$^{-1}$<br>$K_T$ = 7.9E$^{-6}$ L · µg$^{-1}$ · min$^{-1}$ |
| | MDR | — | — | — |
| ZIPGEM | Thomas | 0.651 | y = −0.0002x + 0.4027 | $q_o$ = 0.97 µg · g$^{-1}$<br>$K_T$ = 3.16E$^{-6}$ L · µg$^{-1}$ · min$^{-1}$ |
| | MDR | 0.776 | y = 0.6586x − 2.2615 | $a_{mdr}$ = 0.632<br>$q_o$ = 0.016 µg · g$^{-1}$ |
| BIPGEM-1 | Thomas | 0.417 | y = −0.1497x + 272.75 | $q_o$ = 01.04 µg · g$^{-1}$<br>$K_T$ = 0.002 L · µg$^{-1}$ · min$^{-1}$ |
| | MDR | 0.965 | y = 2.532x − 19.318 | $a_{mdr}$ = 2.53<br>$q_o$ = 1.19 µg · g$^{-1}$ |

TABLE 11

| Media | Adsorption capacity | Experimental setup | Reference |
|---|---|---|---|
| Graphene oxide-coated sand | 10.4 µg · g$^{-1}$ | Concentration range: 5, 20, 50 µg · L$^{-1}$ Lake water Biofilm cultivation | Kumar et al. (2020) |
| *GAC 1 | 1.85 µg · g$^{-1}$ | Initial concentration: 18.77 µg · L$^{-1}$ | Lopes et al. (2017) |
| GAC2 | 4.15 µg · g$^{-1}$ | Reservoir water | |
| BIPGEM-1 | 1.19 µg · g$^{-1}$ | Surface canal water Influent concentration: 70 µg · L$^{-1}$ | Present Invention |

*Granulated Activated Carbon

CONCLUSION

To respond to the increasing drinking water demand and changing water quality, it is crucial to develop proper treatment for surface water affected by nutrients, metals, and algal blooms. The MC-LR removal efficiencies, and adsorp- However, in a dynamic environment (e.g., a karst environment) facing a real water matrix, the adsorption capacity of CPS, ZIPGEM, and BIPGEM-1 could be compromised given the presence of dissolved organic matter and inorganic ions, causing a competition for the available adsorption sites. Such an occurrence was also observed in the isotherm studies, indicating that the presence of $PO_4^{3-}$ decreases the MC-LR removal efficiency of the sorption media. However, the presence of $Ca^{2+}$ resulted in an increase in the MC-LR removal efficiency. Although these trends were represented by the observed change in the percentage removals, the application of a 2-way ANOVA test concluded that these changes are not significant under a 95% confidence interval, further supporting the application of the sorption media in different environments (e.g., a karst environment).

The removal of $PO_4^{3-}$ was not affected by the presence of MC-LR, and in terms of $PO_4^{3-}$ removal the sorption media ZIPGEM outperformed BIPGEM-1 and CPS. The removal efficiency of ZIPGEM ranged from 55-60%. Although this researcher slightly studied the $PO_4^{3-}$ removal efficiency of the sorption media, its efficiency to treat $PO_4^{3-}$ suggests further research to find the adsorption capacity of ZIPGEM and BIPGEM-1. Finally, it can be concluded that the sorption media ZIPGEM, BIPGEM-1, and BIPGEM-2 are a good alternative to treat MC-LR and phosphate in-situ. Given the results, the water matrix needs to be studied before deciding on the appropriate sorption media. For instance, in water with high concentrations of $PO_4^{3-}$ but low concentrations of algal toxin, the sorption media ZIPGEM may be more appropriate. But, in water with high concentration of algal toxins and DOM but lower $PO_4^{3-}$ concentration, the filtration media BIPGEM-1 may be more appropriate. Finally, given the poor MC-LR removal efficiency of CPS in a dynamic condition by physiochemical means, it can be recommended to further examine the biophysiochemical removal of MC-LR, given that the CPS can be a good environment for microbial ecology growth The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Almuhtaram, H., Wang, C. and Hofmann, R. (2021) The importance of measuring ultraviolet fluence accurately: A review of microcystin-LR removal by direct photolysis. Environmental Science & Technology Letters 8 (3), 199-205.

Appel, J. (1973) Freundlich's adsorption isotherm. Surface Science 39 (1), 237-244.

Bakatula, E. N., Richard, D., Neculita, C. M. and Zagury, G. J. (2018) Determination of point of zero charge of natural organic materials. Environmental Science and Pollution Research 25, 7823-7833.

Baldia, S. F., Conaco, M. C. G., Nishijima, T., Imanishi, S. and Harada, K.-I. (2003) Microcystin production during algal bloom occurrence in Laguna de Bay, the Philippines. Fisheries Science 69 (1), 110-116.

Bhatnagar, A. and Jain, A. (2005) A comparative adsorption study with different industrial wastes as adsorbents for the removal of cationic dyes from water. Journal of Colloid and Interface Science 281 (1), 49-55.

Billam, M., Tang, L., Cai, Q., Mukhi, S., Guan, H., Wang, P., Wang, Z., Theodorakis, C. W., Kendall, R. J. and Wang, J. S. (2006) Seasonal variations in the concentration of microcystin-LR in two lakes in western Texas, USA. Environmental Toxicology and Chemistry: An International Journal 25 (2), 349-355.

Bláha, L., Babica, P. and Maršálek, B. (2009) Toxins produced in cyanobacterial water blooms-toxicity and risks. Interdisciplinary Toxicology 2 (2), 36-41.

Byl, T. D., Miller, B., Toomey, R. and Young, D. E. (2021) Harmful Algal Blooms in Karst Terrains. US Geological Survey Karst Interest Group Proceedings, Oct. 19-20, 2021 19, 114.

Campinas, M. and Rosa, M. J. (2006) The ionic strength effect on microcystin and natural organic matter surrogate adsorption onto PAC. Journal of Colloid and Interface Science 299 (2), 520-529.

de Maagd, P. G.-J., Hendriks, A. J., Seinen, W. and Sijm, D. T. (1999) pH-dependent hydrophobicity of the cyanobacteria toxin microcystin-LR. Water Research 33 (3), 677-680.

Dixit, F., Barbeau, B. and Mohseni, M. (2019) Microcystin-LR removal by ion exchange: investigating multicomponent interactions in natural waters. Environmental Pollution 253, 790-799.

Dziga, D., Wasylewski, M., Wladyka, B., Nybom, S. and Meriluoto, J. (2013) Microbial degradation of microcystins. Chemical Research in Toxicology 26 (6), 841-852.

EPA (2015) Drinking Water Health Advisory for the Cyanobacterial Microcystin Toxins Agency, U.S.E.P. (ed).

EPA (2021) Health Effects from Cyanotoxins. Agency, U.S.E.P.A. (ed).

Filatova, D. (2021) Origin and release of cyanotoxins in surface water reservoirs. Ph.D. Dissertation, University of Barcelona, Spain.

Freundlich, H. (1909). Kapillarchemie, 309.

Foss, A. J., Miles, C. O., Wilkins, A. L., Rise, F., Trovik, K. W., Cieslik, K. and Aubel, M. T. (2020) Analysis of total microcystins and nodularins by oxidative cleavage of their ADMAdda, DMAdda, and Adda moieties. Analytica Chimica Acta: X 6, 100060.

Gao, Y. q., Gao, N. y., Deng, Y., Gu, J. s., Shen, Y. c. and Wang, S. x. (2012) Adsorption of Microcystin-LR from Water with Iron Oxide Nanoparticles. Water Environment Research 84 (7), 562-568.

González-López, M., Laureano-Anzaldo, C., Perez-Fonseca, A., Arellano, M. and Robledo-Ortíz, J. (2021) A discussion on linear and non-linear forms of Thomas equation for fixed-bed adsorption column modeling Discusión sobre las formas lineal y no-lineal del modelo de Thomas para el modelado de curvas de ruptura. Revista Mexicana de Ingeniería Química 20 (2), 875-884.

Guo, X. and Wang, J. (2019) Comparison of linearization methods for modeling the Langmuir adsorption isotherm. Journal of Molecular Liquids 296, 111850.

Guo, Y. C., Lee, A. K., Yates, R. S., Liang, S. and Rochelle, P. A. (2017) Analysis of microcystins in drinking water by ELISA and LC/MS/MS. American Water Works Association 109 (3), 13-25.

Ho, Y. and Chiang, C. (2001) Sorption studies of acid dye by mixed sorbents. Adsorption 7 (2), 139-147.

Hu, J., Wang, Z., Ng, W. and Ong, S. (1999) Disinfection by-products in water produced by ozonation and chlorination. Environmental Monitoring and Assessment 59 (1), 81-93.

Huang, W.-J., Cheng, B.-L. and Cheng, Y.-L. (2007) Adsorption of microcystin-LR by three types of activated carbon. Journal of Hazardous Materials 141 (1), 115-122.

Knežević, B. and muk, B. (2021) 2.1. Two-way analysis of variance (ANOVA) without replication. Experimental design and biometric research. Toward Innovations, 130.

Kumar, P., Pérez, J. A. E., Cledon, M., Brar, S. K., Duy, S. V., Sauvé, S. and Knystautas, É. (2020) Removal of microcystin-LR and other water pollutants using sand coated with bio-optimized carbon submicron particles: Graphene oxide and reduced graphene oxide. Chemical Engineering Journal 397, 125398.

Langmuir, I. (1932). Vapor pressures, evaporation, condensation and adsorption. Journal of the American Chemical Society, 54 (7), 2798-2832.

Lambert, T. W., Holmes, C. F. and Hrudey, S. E. (1996) Adsorption of microcystin-LR by activated carbon and removal in full scale water treatment. Water Research 30 (6), 1411-1422.

Lapointe, B. E., Herren, L. W., Debortoli, D. D. and Vogel, M. A. (2015) Evidence of sewage-driven eutrophication and harmful algal blooms in Florida's Indian River Lagoon. Harmful Algae 43, 82-102.

Laureano-Rosario, A. E., McFarland, M., Bradshaw II, D. J., Metz, J., Brewton, R. A., Pitts, T., Perricone, C., Schreiber, S., Stockley, N. and Wang, G. (2021) Dynamics of microcystins and saxitoxin in the Indian River Lagoon, Florida. Harmful Algae 103, 102012.

Lawton, L. A., Robertson, P. K., Cornish, B. J., Marr, I. L. and Jaspars, M. (2003) Processes influencing surface interaction and photocatalytic destruction of microcystins on titanium dioxide photocatalysts. Journal of Catalysis 213 (1), 109-113.

Lee, J. and Walker, H. W. (2006) Effect of process variables and natural organic matter on removal of microcystin-LR by PAC-UF. Environmental Science & Technology 40 (23), 7336-7342.

Lee, J. and Walker, H. W. (2008) Mechanisms and factors influencing the removal of microcystin-LR by ultrafiltration membranes. Journal of Membrane Science 320 (1-2), 240-247.

Lee, J. and Walker, H. W. (2011) Adsorption of microcystin-LR onto iron oxide nanoparticles. Colloids and Surfaces A: Physicochemical and Engineering Aspects 373 (1-3), 94-100.

Li, J., Shimizu, K., Maseda, H., Lu, Z., Utsumi, M., Zhang, Z. and Sugiura, N. (2012) Investigations into the biodegradation of microcystin-LR mediated by the biofilm in wintertime from a biological treatment facility in a drinking-water treatment plant. Bioresource Technology 106, 27-35.

Li, L., Qiu, Y., Huang, J., Li, F. and Sheng, G. D. (2014) Mechanisms and factors influencing adsorption of microcystin-LR on biochars. Water, Air, & Soil Pollution 225 (12), 1-10.

Liu, G., Zheng, H., Zhai, X. and Wang, Z. (2018) Characteristics and mechanisms of microcystin-LR adsorption by giant reed-derived biochars: role of minerals, pores, and functional groups. Journal of Cleaner Production 176, 463-473.

Liu, Y.-L., Walker, H. W. and Lenhart, J. J. (2019a) Adsorption of microcystin-LR onto kaolinite, illite and montmorillonite. Chemosphere 220, 696-705.

Liu, Y.-L., Walker, H. W., Lenhart, J. J. J. C., Physicochemical, S. A. and Aspects, E. (2019b) The effect of natural organic matter on the adsorption of microcystin-LR onto clay minerals. Colloids and Surfaces A: Physicochemical and Engineering Aspects 583, 123964.

Lone, Y., Koiri, R. K. and Bhide, M. (2015) An overview of the toxic effect of potential human carcinogen Microcystin-LR on testis. Toxicology Reports 2, 289-296.

Lopes, W. S., Buriti, J. S., Cebalos, B. S., Sousa, J. T., Leite, V. D., Vieira, F. F. J. W., Air, and Pollution, S. (2017) Removal of microcystin-LR from drinking water using a system involving oxidation and adsorption. Water, Air, and Soil Pollution 228 (9), 1-14.

Mahmood, T., Saddique, M. T., Naeem, A., Westerhoff, P., Mustafa, S. and Alum, A. (2011) Comparison of different methods for the point of zero charge determination of NiO. Industrial & Engineering Chemistry Research 50 (17), 10017-10023.

Mashile, P. P., Mpupa, A. and Nomngongo, P. N. (2018) Adsorptive removal of microcystin-LR from surface and wastewater using tyre-based powdered activated carbon: Kinetics and isotherms. Toxicon 145, 25-31.

Morris, R. J., Williams, D. E., Luu, H. A., Holmes, C. F., Andersen, R. J. and Calvert, S. E. (2000) The adsorption of microcystin-LR by natural clay particles. Toxicon 38 (2), 303-308.

Neumann, U. and Weckesser, J. (1998) Elimination of microcystin peptide toxins from water by reverse osmosis. Environmental Toxicology and Water Quality: An International Journal 13 (2), 143-148.

Nobre, M. M. (1997) Detecção de toxinas (microcistinas) produzidas por cianobactérias (algas azuis) em represas para abastecimento público, pelo método de imunoadsorção ligado à enzima (ELISA).

Ordonez, D., Podder, A., Valencia, A., Sadmani, A. A., Reinhart, D. and Chang, N.-B. (2022) Continuous fixed-bed column adsorption of perfluorooctane sulfonic acid (PFOS) and perfluorooctanoic acid (PFOA) from canal water using zero-valent Iron-based filtration media. Separation and Purification Technology 299, 121800.

Pavagadhi, S., Tang, A. L. L., Sathishkumar, M., Loh, K. P. and Balasubramanian, R. (2013) Removal of microcystin-LR and microcystin-RR by graphene oxide: adsorption and kinetic experiments. Water Research 47 (13), 4621-4629.

Phlips, E. J., Badylak, S., Christman, M., Wolny, J., Brame, J., Garland, J., Hall, L., Hart, J., Landsberg, J. and Lasi, M. (2011) Scales of temporal and spatial variability in the distribution of harmful algae species in the Indian River Lagoon, Florida, USA. Harmful Algae 10 (3), 277-290.

Piyathilaka, P. C. and Manage, P. M (2017) Microcystin-LR Contamination Status and Physico-Chemical Water Quality Parameters of Five Selected Recreational Water Bodies in Sri Lanka. Journal of Food and Agriculture 10 (1-2), 35-42.

Rao, P. L. and Bhattacharya, R. (1996) The cyanobacterial toxin microcystin-LR induced DNA damage in mouse liver in vivo. Toxicology 114 (1), 29-36.

Rong, J., Zhao, Z., Jing, Z., Zhang, T., Qiu, F. and Xu, J. (2017) High-specific surface area hierarchical $Al_2O_3$ carbon fiber based on a waste paper fiber template: preparation and adsorption for iodide ions. Journal of Wood Chemistry and Technology 37 (6), 485-492.

Sathishkumar, M., Pavagadhi, S., Vijayaraghavan, K., Balasubramanian, R. and Ong, S. (2010) Experimental studies on removal of microcystin-LR by peat. Journal of hazardous Materials 184 (1-3), 417-424.

Saxton, M. A., Arnold, R. J., Bourbonniere, R. A., Mckay, R. M. L., & Wilhelm, S. W. (2012). Plasticity of total and intracellular phosphorus quotas in Microcystis aeruginosa cultures and Lake Erie algal assemblages. Frontiers in Microbiology, 3, 3.

Selezneva, A., Seleznev, V. and Sayriddinov, S. S. (2021) Nanofiltration to Purify Drinking Water from Cyanobacteria and Microcystins in Water Supply Systems, p. 022043, IOP Publishing.

Setoguchi, S., Leddin, D., Metz, G. and Omary, M. B. (2022) Climate change, health, and health care systems: a global perspective. Gastroenterology 162 (6), 1549-1555.

Shawwa, A. R. and Smith, D. W. (2001) Kinetics of microcystin-LR oxidation by ozone. Ozone Science & Engineering 23 (2), 161-170.

Song, J., Zou, W., Bian, Y., Su, F. and Han, R. (2011) Adsorption characteristics of methylene blue by peanut husk in batch and column modes. Desalination 265 (1-3), 119-125.

Su, X., Steinman, A. D., Tang, X., Xue, Q., Zhao, Y. and Xie, L. (2017) Response of bacterial communities to cyanobacterial harmful algal blooms in Lake Taihu, China. Harmful Algae 68, 168-177.

Subramaniam, M., Goh, P., Abdullah, N., Lau, W., Ng, B. and Ismail, A. (2017) Adsorption and photocatalytic degradation of methylene blue using high surface area titanate nanotubes (TNT) synthesized via hydrothermal method. Journal of Nanoparticle Research 19 (6), 1-13.

Sultana, S., Awal, S., Shaika, N. A. and Khan, S. (2022) Cyanobacterial blooms in earthen aquaculture ponds and their impact on fisheries and human health in Bangladesh. Aquaculture Research 53 (15), 5129-5141.

Teixeira, M. R. and Rosa, M. J. (2005) Microcystins removal by nanofiltration membranes. Separation and Purification Technology 46 (3), 192-201.

Valencia, A., Ordonez, D., Sadmani, A. A., Reinhart, D. and Chang, N. B. (2023) Comparing Removal Mechanisms and Efficiencies of Long and Short Chain Per- and Polyfluoroalkyl Substances (PFAS) in Specialty Adsorbents Science of the Total Environment. in review.

Vieira, J. M. d. S., Azevedo, M. T. d. P., de Oliveira Azevedo, S. M. F., Honda, R. Y. and Corrêa, B. (2005) Toxic cyanobacteria and microcystin concentrations in a public water supply reservoir in the Brazilian Amazonia region. Toxicon 45 (7), 901-909.

Villars, K., Huang, Y. and Lenhart, J. J. (2020) Removal of the cyanotoxin microcystin-LR from drinking water using granular activated carbon. Environmental Engineering Science 37 (9), 585-595.

Wang, Q., Pang, W., Mao, Y., Ge, S., Yu, H., Dai, C., & Zhao, M. (2019). Changes of extracellular polymeric substance (EPS) during Microcystis aeruginosa blooms at different levels of nutrients in a eutrophic microcosmic simulation device. Polish Journal of Environmental Studies, 29 (1), 349-360.

WHO (2020) Cyanobacterial toxins: microcystins Background document for development of WHO Guidelines for drinking-water quality and Guidelines for safe recreational water environments. Organization, W.H. (ed).

Wu, C., Tu, J., Liu, W., Zhang, J., Chu, S., Lu, G., Lin, Z. and Dang, Z. (2017) The double influence mechanism of pH on arsenic removal by nano zero valent iron: electrostatic interactions and the corrosion of FeO. Environmental Science: Nano 4 (7), 1544-1552.

Xiao, X., Li, F., Huang, J., Sheng, G. D. and Qiu, Y. (2012) Reduced adsorption of propanil to black carbon: effect of dissolved organic matter loading mode and molecule size. Environmental Toxicology and Chemistry 31 (6), 1187-1193.

egura, B., Sedmak, B. and Filipič, M. (2003) Microcystin-LR induces oxidative DNA damage in human hepatoma cell line HepG2. Toxicon 41 (1), 41-48.

Zhan, M.-m. and Hong, Y. (2022) Recent Advances in Technologies for Removal of Microcystins in Water: a Review. Current Pollution Reports, 1-15.

Zhang, N., Xu, B., & Qi, F. (2016). Effect of phosphate loading on the generation of extracellular organic matters of Microcystis aeruginosa and its derived disinfection by-products. Water, Air, & Soil Pollution, 227, 1-12.

Zhang, X., He, J., Xiao, S. and Yang, X. (2019) Elimination kinetics and detoxification mechanisms of microcystin-LR during UV/Chlorine process. Chemosphere 214, 702-709.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A composition for treating water having at least one cyanobacterial toxin, the composition comprising:
    a plurality of sand particles comprising about 80 vol %;
    a plurality of biochar particles comprising about 5 vol %;
    a plurality of perlite particles;
    a plurality of zero-valent iron (hereinafter "ZVI") particles;
    wherein the volume percentage of the plurality of ZVI particles is less than or equal to a volume percentage of the biochar particles;
    wherein the plurality of biochar particles and the plurality of ZVI particles are chemically bonded, thereby forming a ZVI-biochar honeycomb structure; and
    wherein the ZVI-biochar honeycomb structure comprises a plurality of adsorption sites, such that at least one of the plurality of adsorption sites for the at least one cyanobacterial toxin is endothermic, exothermic, or both.

2. The composition of claim 1, further comprising a plurality of clay particles comprising about 5 vol %.

3. The composition of claim 2, wherein the volume percentage of the plurality of perlite particles, the plurality of ZVI molecules, or both is about 5 vol %.

4. The composition of claim 3, wherein the plurality of biochar particles are at most about 25 vol %.

5. The composition of claim 4, wherein the ZVI-biochar honeycomb structure interacts with at least one of the plurality of clay particles, thereby forming at least one ZVI-biochar-clay structure.

6. The composition of claim 5, wherein the at least one ZVI-biochar-clay structure of the synergistic composition comprises a point of zero charge (hereinafter "PZC") of about 9.6 to about 10.6.

7. The composition of claim 6, wherein the at least one ZVI-biochar-clay structure of the synergistic composition comprises a saturated hydraulic conductivity of $0.6(10^{-4})$ m*sec$^{-1}$ to about $2.8(10^{-4})$m*sec$^{-1}$.

8. The composition of claim 7, wherein the at least one ZVI-biochar-clay structure of the synergistic composition is porous.

9. The composition of claim 8, wherein the at least one ZVI-biochar-clay structure of the synergistic composition is homogeneous.

10. The composition of claim 9, wherein the ZVI-biochar-clay structure further comprises a Brunauer-Emmett-Teller (hereinafter "BET") surface area of about 1.35 m$^2$/g to about 3.08 m$^2$/g.

11. The composition of claim 10, wherein the ZVI-biochar-clay structure further comprises a density of about 2.59 g*cm$^3$ to about 2.67 g*cm$^3$.

12. The composition of claim 11, wherein the ZVI-biochar-clay structure further comprises the adsorption capacity of about 1.19 µg/g.

13. A filtration system for treating water containing cyanobacterial toxins, the filtration system comprising:
    a media chamber including a homogeneously mixed composition, the homogenously mixed composition comprising:
    a plurality of sand particles comprising about 80 vol %;
    a plurality of biochar particles comprising about 5 vol %;

a plurality of perlite particles;

a plurality of zero-valent iron (hereinafter "ZVI") particles;

wherein the volume percentage of the plurality of ZVI particles is less than or equal to a volume percentage of the biochar particles;

wherein the plurality of biochar particles and the plurality of ZVI particles are chemically bonded, thereby forming a ZVI-biochar honeycomb structure; and wherein the ZVI-biochar honeycomb structure comprises a plurality of adsorption sites, such that at least one of the plurality of adsorption sites for the at least one cyanobacterial toxin is endothermic, exothermic, or both.

14. The filtration system of claim 13, further comprising a plurality of clay particles comprising about 5 vol %.

15. The filtration system of claim 14, wherein the volume percentage of the plurality of perlite particles, the plurality of ZVI molecules, or both is about 5 vol %.

16. The filtration system of claim 15, wherein the plurality of biochar particles are at most about 25 vol %.

17. A method of optimizing cyanobacterial toxin removal from a water supply, the method comprising:

incorporating a homogenously mixed synergistic composition into the water supply, the homogenously mixed composition comprising:

a plurality of sand particles comprising about 80 vol %;

a plurality of biochar particles comprising about 5 vol %;

a plurality of perlite particles;

a plurality of zero-valent iron (hereinafter "ZVI") particles;

wherein the volume percentage of the plurality of ZVI particles is less than or equal to a volume percentage of the biochar particles;

wherein the plurality of biochar particles and the plurality of ZVI particles are chemically bonded, thereby forming a ZVI-biochar honeycomb structure; and wherein the ZVI-biochar honeycomb structure comprises a plurality of adsorption sites, such that at least one of the plurality of adsorption sites for the at least one cyanobacterial toxin is endothermic, exothermic, or both; and wherein the incorporation of the homogenously mixed synergistic composition into the water supply thereof optimizes the cyanobacterial toxin removal within the water supply.

18. The method of claim 17, wherein the homogenously mixed synergistic composition further comprises a plurality of clay particles comprising about 5 vol %.

19. The method of claim 18, wherein the volume percentage of the plurality of perlite particles, the plurality of ZVI molecules, or both is about 5 vol %.

20. The method of claim 19, wherein the plurality of biochar particles are at most about 25 vol %.

* * * * *